(12) United States Patent
Shintani

(10) Patent No.: US 8,069,743 B2
(45) Date of Patent: Dec. 6, 2011

(54) SHIFT OPERATION DEVICE OF AUTOMATIC TRANSMISSION

(75) Inventor: Masanori Shintani, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 270 days.

(21) Appl. No.: 12/605,840

(22) Filed: Oct. 26, 2009

(65) Prior Publication Data

US 2010/0126294 A1   May 27, 2010

(30) Foreign Application Priority Data

Nov. 27, 2008  (JP) ................ P2008-302879

(51) Int. Cl.
*F16H 3/08*   (2006.01)
(52) U.S. Cl. .......................... 74/330; 74/335
(58) Field of Classification Search ............. 74/330
See application file for complete search history.

(56) References Cited

U.S. PATENT DOCUMENTS

| | | | | |
|---|---|---|---|---|
| 5,473,959 | A * | 12/1995 | Lasoen | 74/335 |
| 2005/0247146 | A1 | 11/2005 | Kluge | |
| 2006/0117892 | A1 | 6/2006 | Ebenhoch et al. | |
| 2006/0219033 | A1 * | 10/2006 | Gitt | 74/330 |
| 2007/0289399 | A1 * | 12/2007 | Tanba et al. | 74/330 |

FOREIGN PATENT DOCUMENTS

| | | |
|---|---|---|
| DE | 101 08 881 A1 | 9/2002 |
| DE | 102 31 547 A1 | 1/2004 |
| DE | 103 16 163 A1 | 11/2004 |
| EP | 1 308 651 A1 | 5/2003 |
| JP | 2001-304411 A | 10/2001 |
| JP | 2002-267011 A | 9/2002 |
| JP | 2005-532517 A | 10/2005 |
| JP | 2006-522901 A | 12/2006 |
| JP | 2008-215437 A | 9/2008 |

* cited by examiner

*Primary Examiner* — Edwin A Young
(74) *Attorney, Agent, or Firm* — Birch, Stewart, Kolasch & Birch, LLP

(57) ABSTRACT

A shift operation device includes: a shift operation member including: a shaft portion; and an arm portion protruding in a radial direction with respect to a center axis of the shaft portion and being rotated around the center axis to perform shift operation of a gear; and a plurality of shift rail members, each of which includes: a rail portion; a shift fork portion; and a shift lug portion capable of being engaged with the arm portion. An engagement portion of the shift lug portion includes a pair of columnar projections arranged at positions mutually different in the shift direction and the select direction. When the shift lug portion is retained in a neutral position, pressure receiving surfaces of the columnar projections are approximately positioned on a reference orthogonal surface superimposed on the center axis and orthogonal to the rail portion.

4 Claims, 17 Drawing Sheets

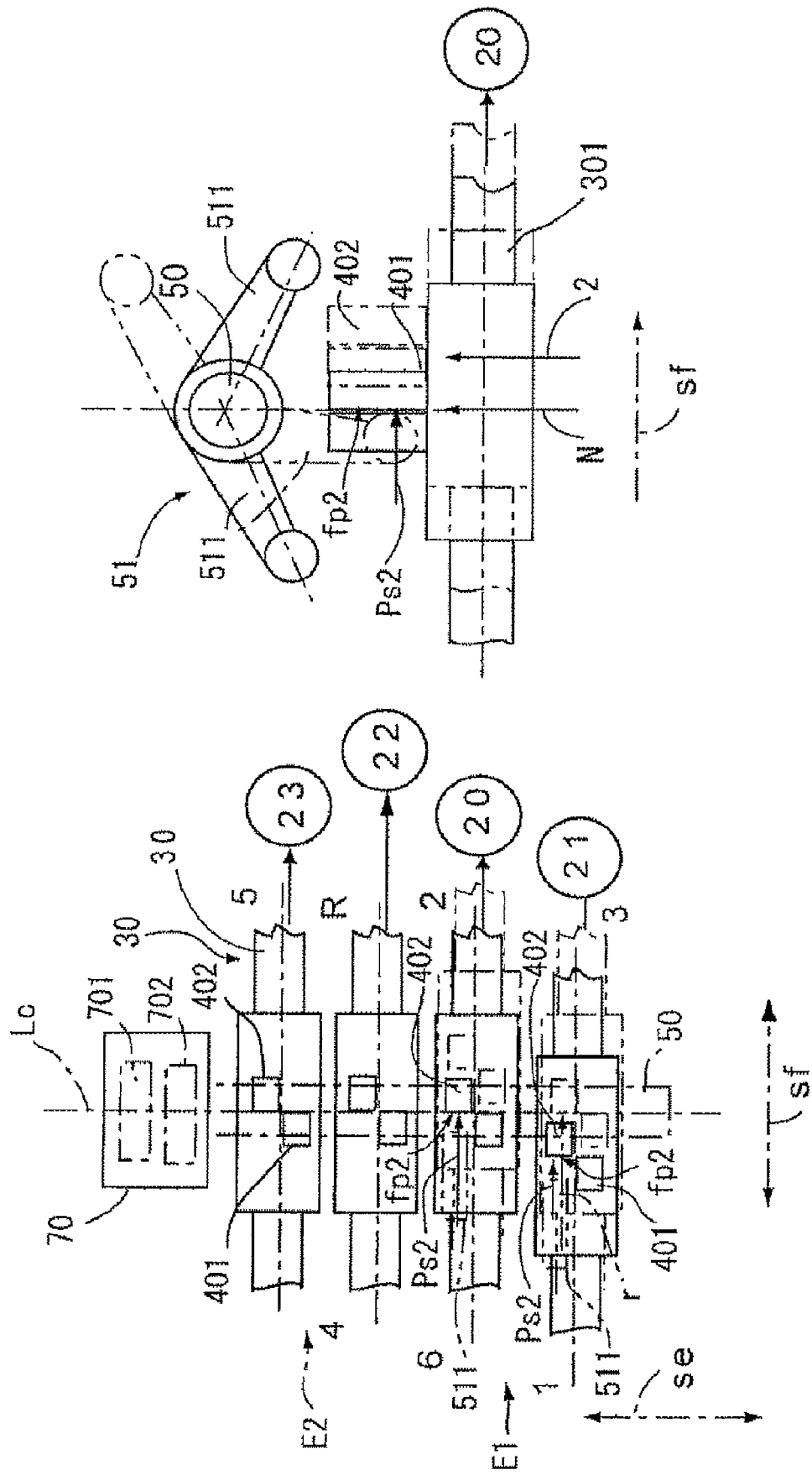

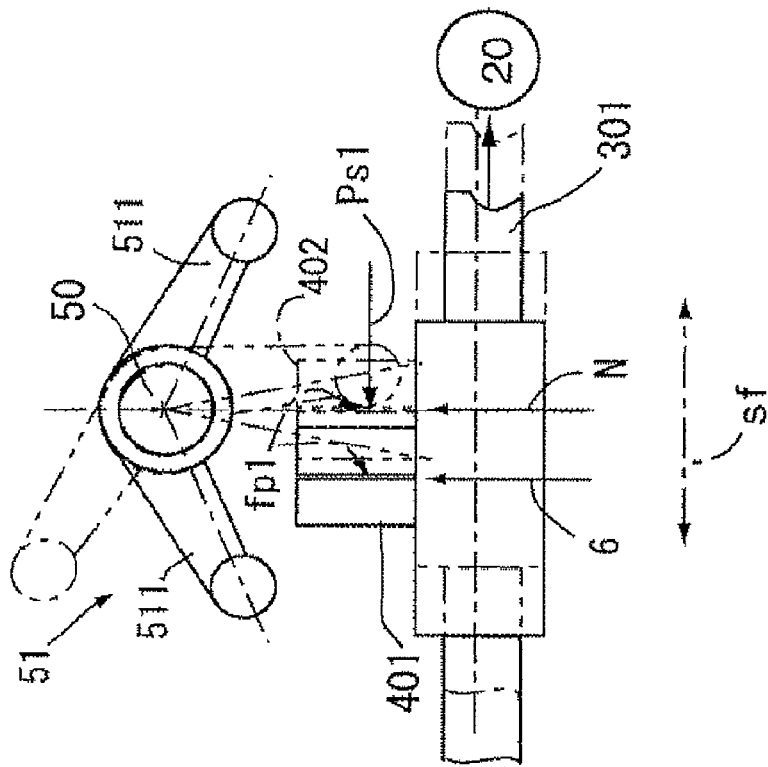
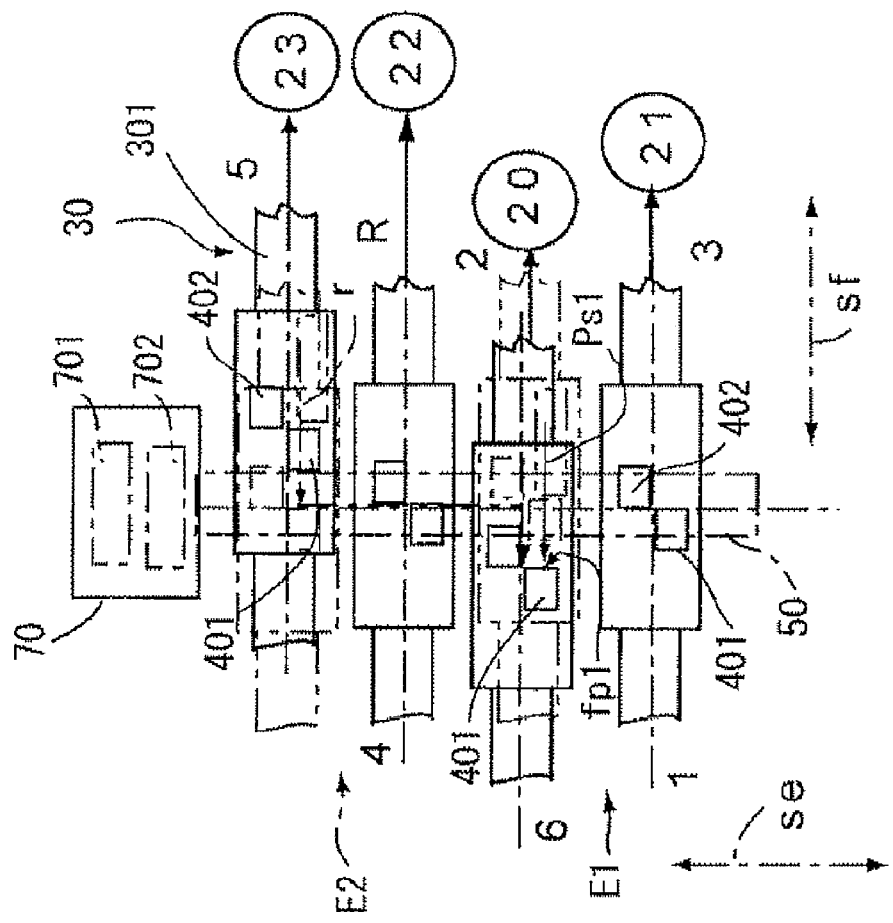
FIG. 8B
FIG. 8A

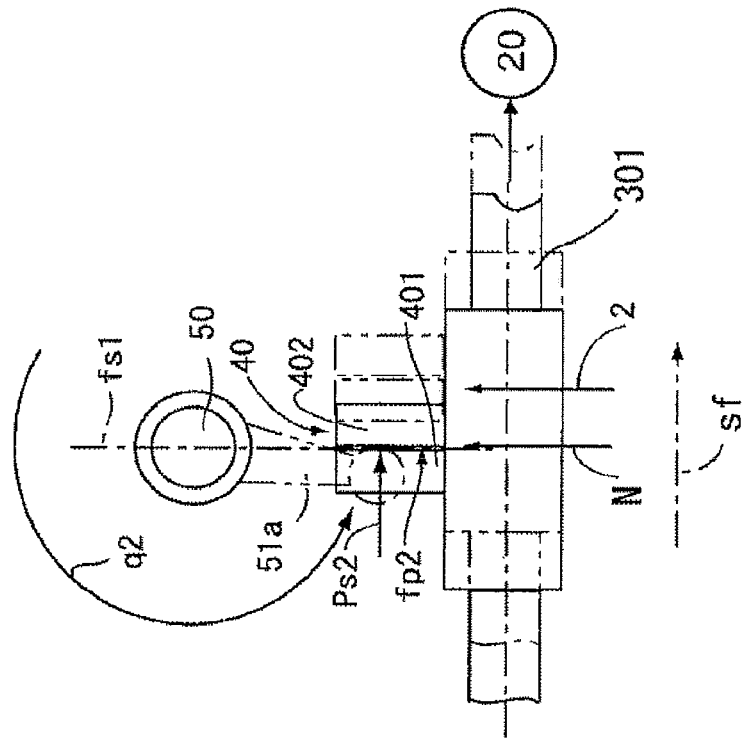
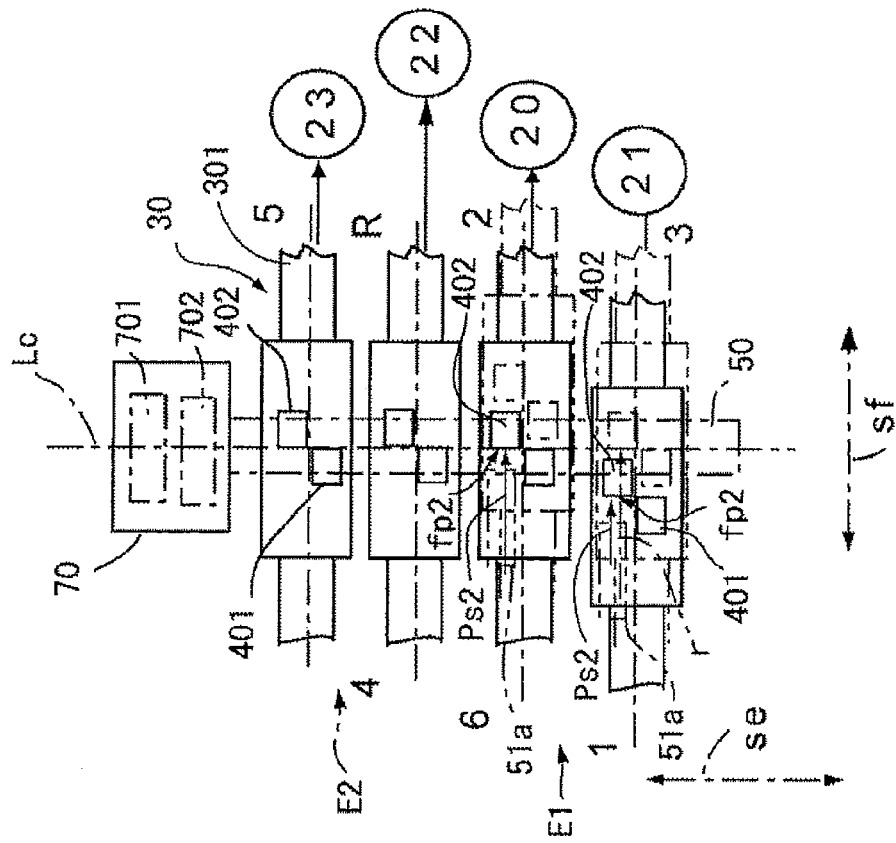
FIG. 11B
FIG. 11A

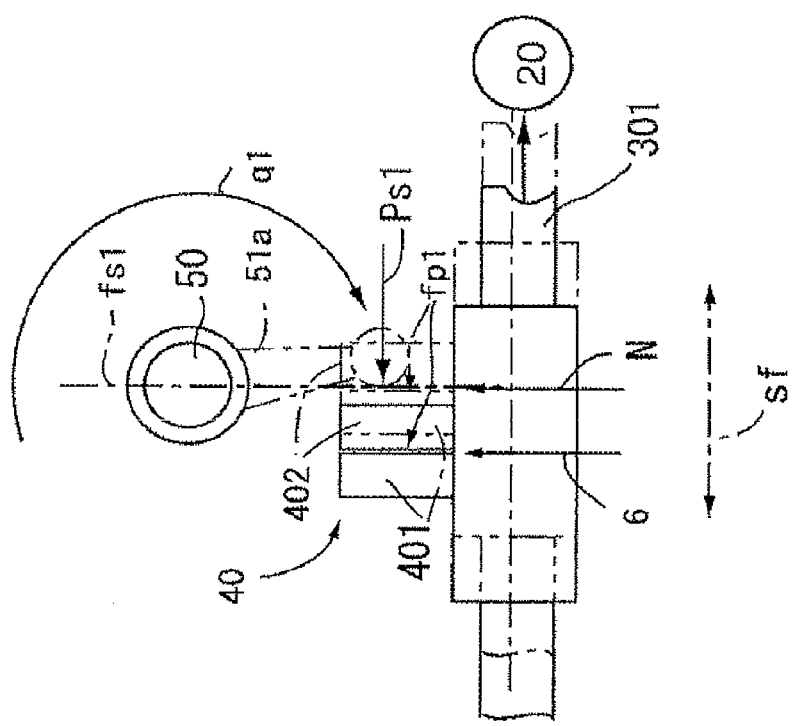
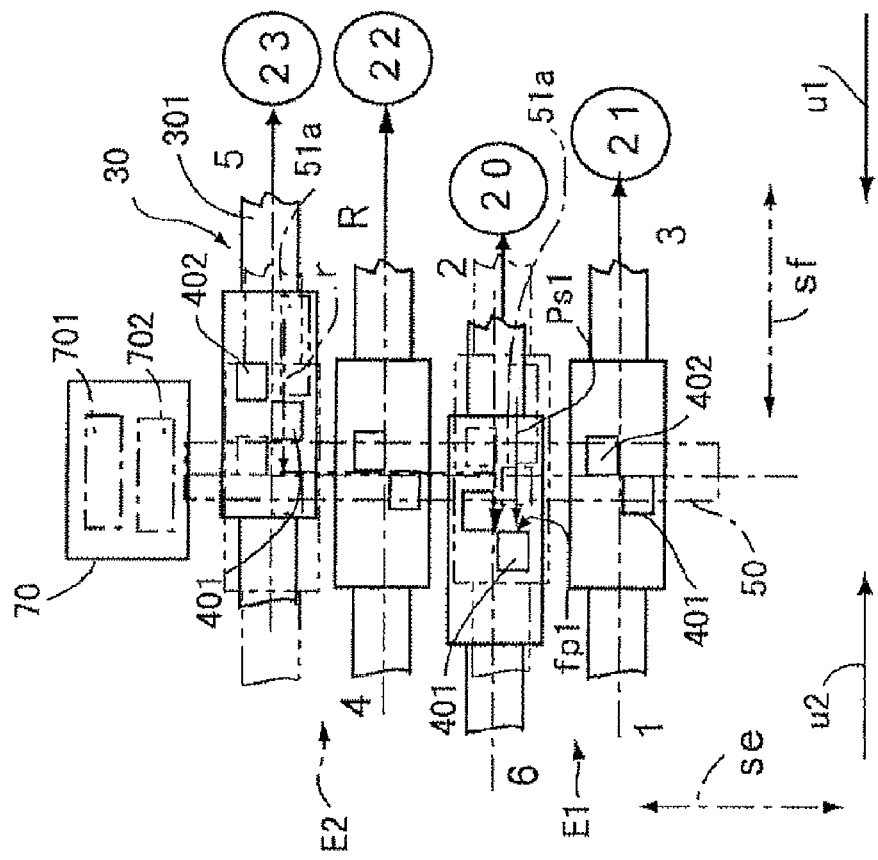
FIG. 12B
FIG. 12A

SHIFT OPERATION DEVICE OF AUTOMATIC TRANSMISSION

BACKGROUND OF THE INVENTION

The present invention relates to a shift operation device of an automatic transmission provided on a driving-force transmitting system of a vehicle.

As a transmission provided on a driving-force transmitting system of a vehicle, a mechanical automatic transmission is known.

The mechanical automatic transmission enables automatic gearshift by actuating an actuator to operate a gearshift mechanism and connect/disconnect a clutch. For example, as shown in FIG. 14A and FIG. 14B, a shift operation device of the automatic transmission is provided with a shift shaft 100 capable of moving in a shift direction sf and in a select direction se, shift lugs 120 formed in an outwardly protruding manner respectively on parts of shift rails 110 arrayed in parallel in the select direction se, and shift forks 131, 132, 133 integrally joined to other parts of the shift rails 110, respectively.

The shift shaft 100 is provided with a control finger (select member) 140 protruded in a radial direction, and a pair of pawl portions 121, 122 are formed at each of the shift lugs 120 with an interval in the shift direction sf.

In the above-described mechanical automatic transmission, the shift shaft 100 is moved by an actuator to arrange the control finger 140 between the pair of pawl portions 121, 122, thereby pressing and moving the pair of pawl portions 121, 122 selectively in one or the other direction of the shift direction sf. Then, the shift fork 131 working therewith shift-actuates a corresponding gear (not illustrated).

Incidentally, a dual clutch-equipped automatic transmission in which two clutches are incorporated between the above-described automatic transmission and an engine which is a driving source has been developed. This automatic transmission is provided with a first main shaft and a second main shaft, and the first and second main shafts change a rotating force coming from each of the clutches and transfer the rotating force to each of corresponding auxiliary shafts, thereby the changed rotation from each of the auxiliary shafts is transmitted to transmission output gears.

In the above-described dual clutch-equipped automatic transmission, a state in which one gear is connected to one of the clutches via the first main shaft is switched to a state in which a target gear is connected to the other of the clutches via the second main shaft. In this instance, the shift operation of the target gear is completed in advance and, thereafter, one of the clutches is disconnected. Thus, it is not necessary to be in a neutral state at the time of gearshift, and a seamless gearshift can be achieved.

A shift operation device adopted in the above-described automatic transmission is, for example, as shown in FIG. 15A, that where a current gear is a fourth speed gear, the gear is shifted to a target gear, for example, a first speed gear, while the current gear is retained as it is. As shown in FIG. 15B, immediately thereafter, a shift withdrawal of a previous gear (here, the fourth speed gear) is performed during the proceeding of the synchronization of the target gear. A description will be given by referring to a trace shown by the double dotted chain line. In this shift withdrawal, first, it is necessary to smoothly conduct a step (1) for deviating in a select direction from a position of the target gear (first speed gear), a shift step (2) for returning to a neutral line N, a select step (3) for moving to a gear (fourth speed gear), a shift step (4) for moving to the gear (fourth speed gear), a select step (5) for moving into the gear (fourth speed gear) and a shift withdrawal step (6) for moving to the neutral line N (indicated by the double dotted chain line) of the gear (fourth speed gear).

In addition, JP-A-2001-304411 has proposed a shift operation device including a pair of pawl portions provided on each of the shift lugs. Since an interval between the pawl portions is widened in a shift direction, a shift member is allowed to merely move in a select direction from a space between the pair of pawl portions on a shift lug which is in a shifted state so as to be placed between the pair of pawl portions on the shift lug of a target gear in a neutral state, thereby simplifying the movement of the shift member.

As described above, in the dual clutch-type automatic transmission, it is necessary to shift a target gear and perform a shift withdrawal of a current gear in this order at the time of gearshift. Therefore, the movement of the control finger 140 is complicated which results in a prolonged gearshift time.

In particular, in the technique disclosed in JP-A-2001-304411, for the purpose of solving the complicated movement of the control finger 140, the shift member (control finger) can be placed into a space between a pair of pawl portions when the shift member moves in a select direction even in a state that a shift rail of any gear is shifted. For this reason, the pair of pawl portions must be arranged, with an interval between them opened relatively widely. Then, a problem is posed that a wider interval as described above will result in a poor load transmitting efficiency. For example, as shown in FIG. 13, it is necessary that an interval between a pair of pawl portions 121 is set greater as shown in a state of L1 indicated by the solid line than a state of L1' indicated by the double dotted chain line. Consequently, the pawl portions 121 are pressed by the shift member 140 in a state greatly inclined toward the shift direction.

In this case, where a force of the pawl portions 121 acting on a wall surface by a rotating torque T of a control shaft 100 is given as a tangential force F, a distance from a contact point a of the shift member 140 with the pawl portions 121 to a shaft center C of the control shaft 100 is given as a distance L2 and an inclined angle of a line connecting the contact point a with the shaft center C in a shift direction is given as an angle α, a component force of the tangential force F in the shift direction, that is, a component force P1 which allows the wall surface of the pawl portion 121 to move in the shift direction, or an orthogonal direction, can be obtained by the following formula (1).

$$P1 = F^* \cos \alpha = T^* \cos \alpha / L2 \qquad (1)$$

In the above formula (1), on the assumption that the distance L2 is constant irrespective of the angle α, it is apparent that the component force P1 is decreased with an increase in the angle α in a range of 0 to 90 degrees. Therefore, as disclosed in JP-A-2001-304411, a larger interval L1 between the pair of pawl portions 121 will decrease the force P1 pressing the wall surface of the pawl portion 121 toward the shift direction, that is, an orthogonal direction, thereby it is necessary to make greater the force P1 pressing toward the shift direction in shifting operation than in a shift withdrawal operation. However, it is difficult to move the shift lug 129 in the shift direction at a higher transmission efficiency, and a larger driving source (for example, an electric motor) is needed for outputting an operation force required due to a decreased transmission efficiency of the operation force, which will result in a larger-sized device and the loss of energy. Alternatively, a greater operation force requires a reduction gear greater in reduction ratio and prolongs the time of moving the shift member accordingly. This poses a problem in reducing the gearshift time.

SUMMARY

It is therefore an object of the invention to provide a shift operation device of an automatic transmission in which a pressing force of an arm portion in a shift direction can be retained relatively great, shift operation time can be reduced and the shift operability by the arm portion, which is integrally formed with a shift shaft, at the time of gearshift can be improved.

In order to achieve the object, according to the invention, there is provided a shift operation device of an automatic transmission comprising:

a shift operation member including:
  a shaft portion supported in a casing of the transmission so as to make a relative displacement in a select direction; and
  an arm portion protruding in a radial direction with respect to a center axis of the shaft portion, and moving in the select direction while being retained in a set-back position in which the arm portion is movable in the select direction, thereafter being rotated around the center axis to perform shift operation of a gear; and
a plurality of shift rail members, each of which includes:
  a rail portion supported in the casing so as to make a relative displacement;
  a shift fork portion protruding from the rail portion and performing shift operation of a gear; and
  a shift lug portion protruding from the rail portion and capable of being engaged with the arm portion;
wherein an engagement portion of the shift lug portion which is engaged with the arm portion includes a pair of columnar projections arranged at positions mutually different in the shift direction and in the select direction, one of the columnar projections includes a one-side pressure receiving surface for receiving a one-direction pressing force in one direction of the shift direction from the arm portion, the other of the columnar projections includes an other-side pressure receiving surface for receiving an opposite-direction pressing force in a direction opposite to the one-direction pressing force from the arm portion, when the shift lug portion is retained in a neutral position, the one-side pressure receiving surface and the other-side pressure receiving surface are approximately positioned on a reference orthogonal surface which is superimposed on the center axis of the shaft portion and which is orthogonal to the rail portion, and the arm portion is rotated around the center axis from the set-back position to apply the one-direction pressing force to the one-side pressure receiving surface, thereby shift-actuating the shift fork portion in one direction and the arm portion is rotated reversely around the center axis form the set-back position to apply the other-direction pressing force to the other-side pressure receiving surface, thereby shift-actuating the shift fork portion in the other direction.

The arm portion may be formed in a protruding manner from the shaft portion so as to be a pair of arm portions having a bifurcated shape and be retained such that the engagement portion of the shift lug portion is arranged at an intermediate part between both of the arm portions when being retained in the set-back position.

The automatic transmission may have a plurality of gears. The gears may be divided into a first group and a second group. A first main shaft and a second main shaft corresponding to the first group and the second group, respectively may be provided. Both of the first and second main shafts may be coupled via a dual clutch to an output shaft of an engine.

The automatic transmission may have a transmission output gear for outputting a rotating force shifted by the gear. The plurality of gears may be divided into a third group and a fourth group. A first auxiliary shaft and a second auxiliary shaft which correspond to the third group and the fourth group, respectively and transmit to the transmission output gear a rotating force shifted may be provided. The shaft portion may be formed with, in a protruding manner: an arm portion for shifting each gear in the third group at a first position; and an arm portion for shifting each gear in the fourth group at a second position. The first position and the second position may be arranged so as to be spaced with a predetermined interval in the select direction.

BRIEF DESCRIPTION OF THE DRAWINGS

FIG. 6A shows the time of shift to one direction, and FIG. 6B shows the time of shift to the other direction (opposite direction).

FIG. 7A and FIG. 7B are respectively a plan view and a side view for explaining the operation of the arm portion and the protruded portion when a gear is shifted from a first speed gear to a second speed gear by the shift operation device shown in FIG. 1.

FIG. 8A and FIG. 8B are respectively a plan view and a side view for explaining the operation of the arm portion and the protruded portion when a gear is shifted from a fifth speed gear to a sixth speed gear by the shift operation device shown in FIG. 1.

FIG. 11A and FIG. 11B are respectively a plan view and a side view for explaining the operation of the arm portion and the protruded portion when a gear is shifted from a first speed gear to a second speed gear by the shift operation device shown in FIG. 9.

FIG. 12A and FIG. 12B are respectively a plan view and a side view for explaining the operation of the arm portion and the protruded portion when a gear is shifted from a fifth speed gear to a sixth speed gear by the shift operation device shown in FIG. 9.

FIG. 15A is a plan view showing a case in which a current gear is a fourth speed gear and shifted to a first speed gear, and FIG. 15B is a plan view showing a case in which the shift withdrawal operation of the fourth speed gear is performed.

DETAILED DESCRIPTION OF EMBODIMENTS

Hereinafter, a description will be given for a shift operation device of an automatic transmission as an embodiment of the present invention by referring to FIG. 1 to FIG. 2.

Figure 1:
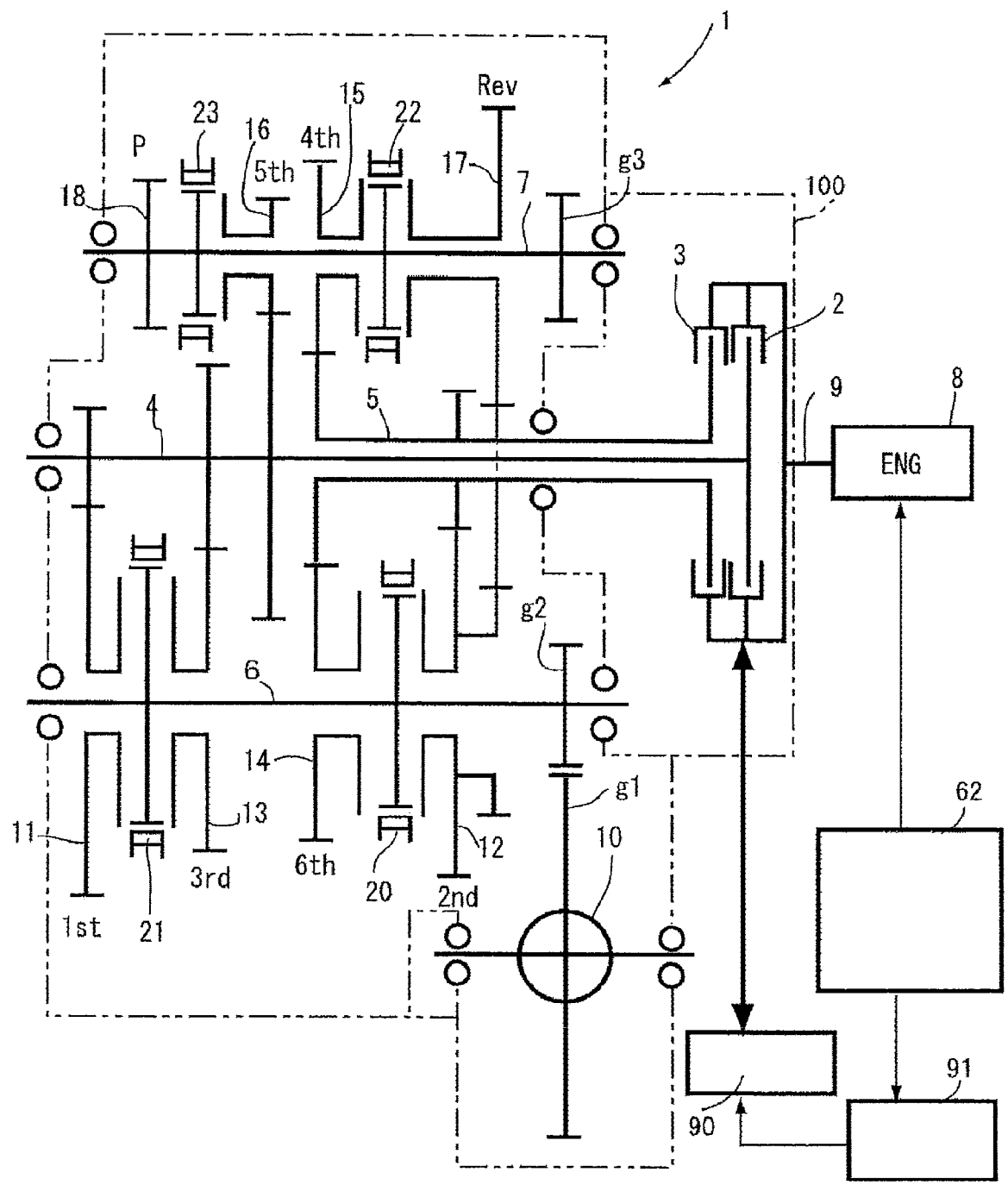
FIG. 1 is a schematic configuration diagram showing a driving-force transmitting system of a vehicle equipped with a shift operation device of an automatic transmission as one embodiment of the present invention.

As shown in FIG. 1, an automatic transmission 1 is a dual clutch-type automatic transmission and provided with two clutches 2, 3 inside a casing 100, two main shafts 4, 5 arranged coaxially and two auxiliary shafts 6, 7. In the first main shaft 4, power is transmitted via the first clutch 2 from an output shaft 9 of an engine 8. In the second main shaft 5, the power is transmitted via the second clutch 3 from the output shaft 9. These two clutches 2, 3 are controlled for connection and disconnection by a hydraulic control circuit 90.

In addition, the clutches 2, 3 will not be controlled for connection and disconnection only by hydraulic control but may be controlled by an electrical control method using an electric motor.

The first auxiliary shaft 6 and the second auxiliary shaft 7 are arranged respectively in a separated manner so that axes of the first auxiliary shaft 6 and the second auxiliary shaft 7 are parallel with those of the first main shaft 4 and the second main shaft 5. An output gear g2 of the auxiliary shaft 6 and an output gear g3 of the auxiliary shaft 7 are both constituted so as to transmit power to a reduction gear g1 of a differential gear 10 at a rear stage of the automatic transmission 1.

A first speed gear 11, a second speed gear 12, a third speed gear 13 and a sixth speed gear 14 are pivotally supported on the first auxiliary shaft 6 so as to make a relative rotation. A fourth speed gear 15, a fifth speed gear 16 and a reverse gear 17 are pivotally supported on the second auxiliary shaft 7 so as to make a relative rotation, and a parking gear 18 is also firmly attached thereto.

Figure 2:
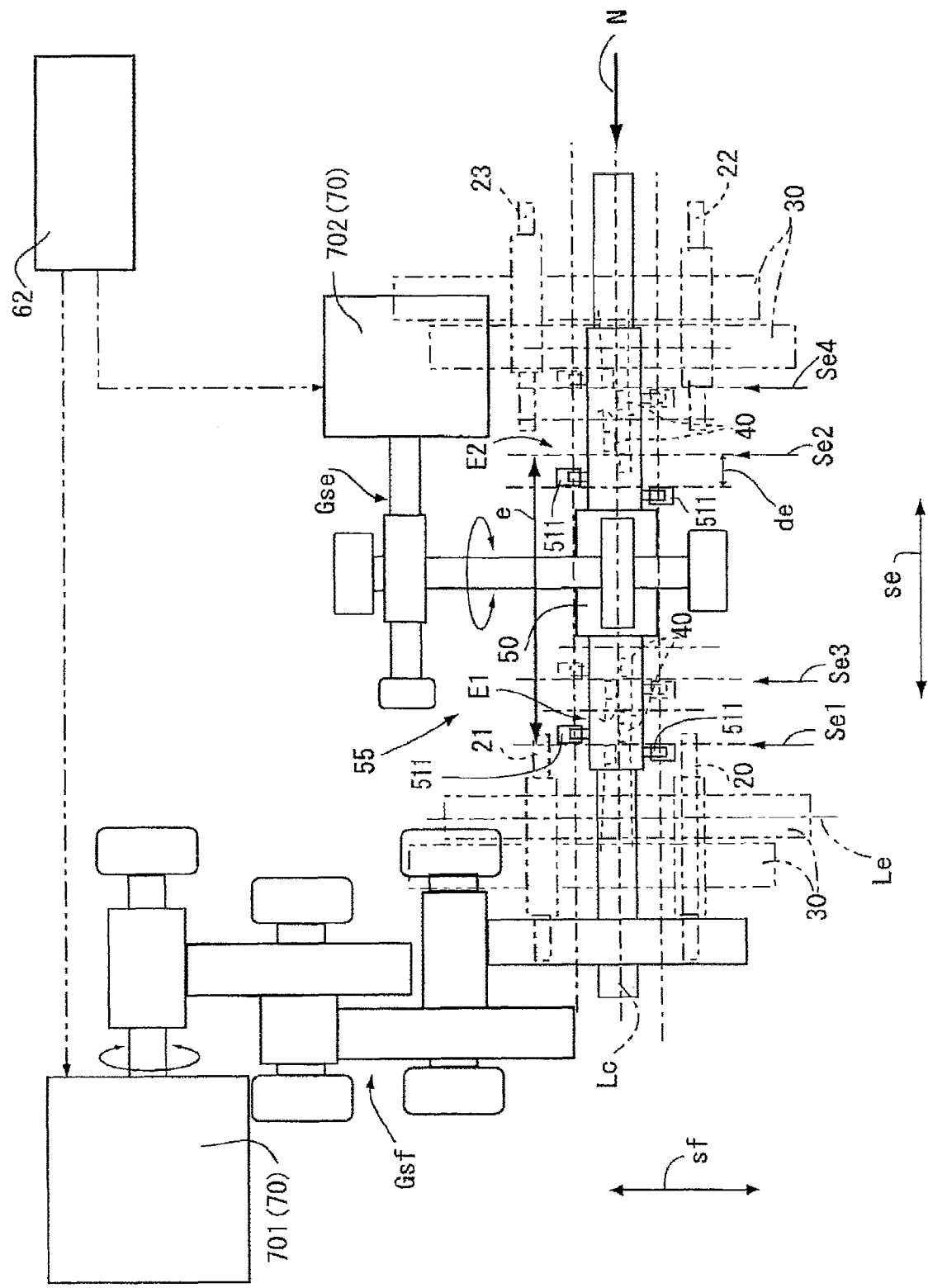
FIG. 2 is a schematic plan view for explaining the shift operation device shown in FIG. 1.
Figure 3:
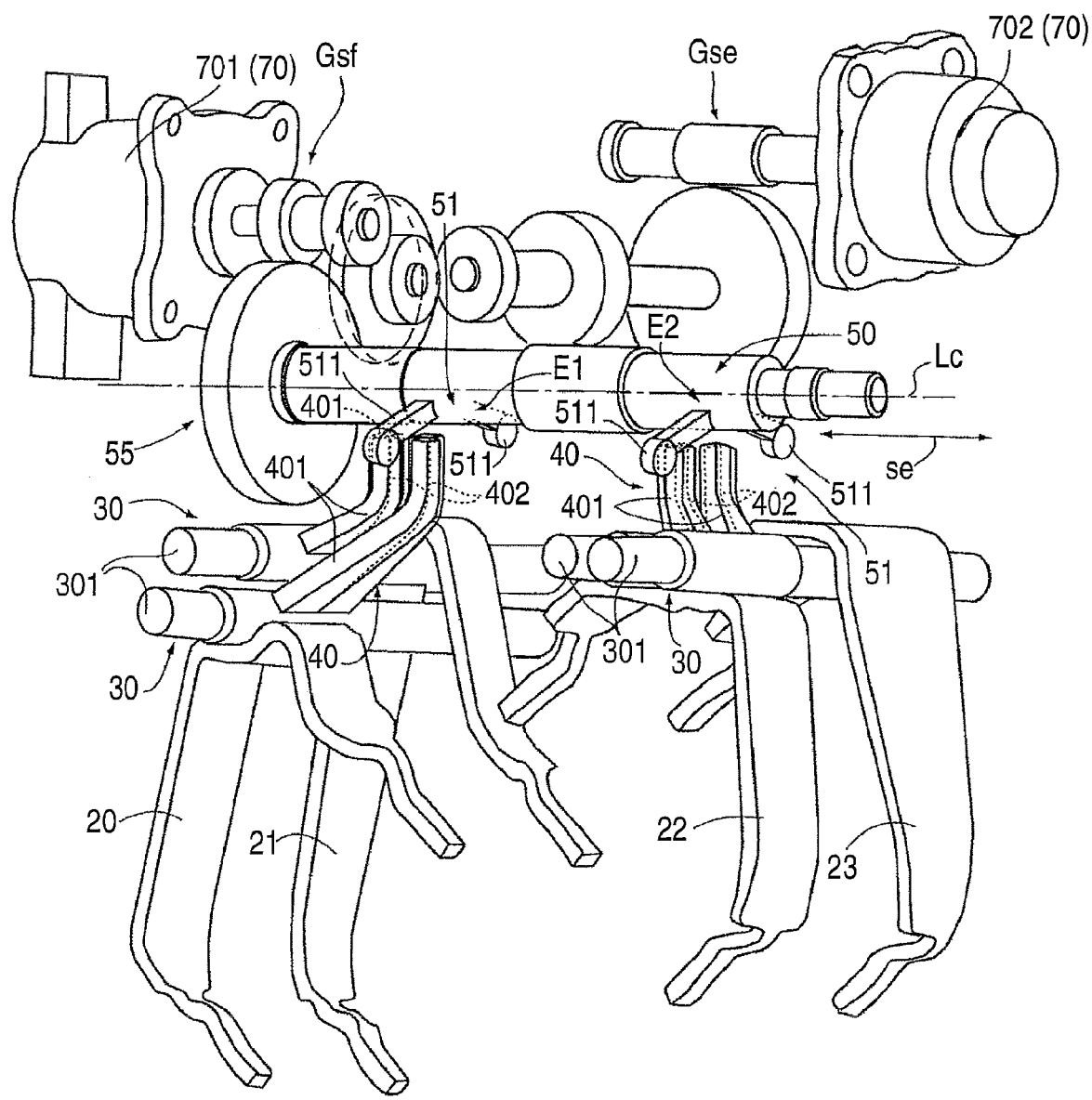
FIG. 3 is a schematic perspective view of the shift operation device shown in FIG. 1.

As shown in FIG. 2 and FIG. 3, the automatic transmission 1 is provided with four shift forks 20 to 23 protruding from a rail to be described later. As shown in FIG. 1, the first shift fork 20 and the second shift fork 21 are placed so as to move in a sliding manner along the axis of the first auxiliary shaft 6, and the third shift fork 22 and the fourth shift fork 23 are placed so as to move in a sliding manner along the axis of the second auxiliary shaft 7.

These shift forks 20 to 23 are allowed to move in a sliding manner, thereby the shift operation to connect or disconnect the second speed gear 12 and the sixth speed gear 14 to or from the auxiliary shaft 6 via a synchronization mechanism can be selectively performed by the first shift fork 20 and the shift operation to connect or disconnect the first speed gear 11 and the third speed gear 13 to or from the auxiliary shaft 6 via the synchronization mechanism can be selectively performed by the second shift fork 21. Further, the shift operation to connect or disconnect the fourth speed gear 15 and the reverse gear 17 to or from the auxiliary shaft 7 via the synchronization mechanism can be selectively performed by the third shift fork 22 and the shift operation to connect or disconnect the fifth speed gear 16 to or from the auxiliary shaft 7 via the synchronization mechanism can be selectively performed by the fourth shift fork 23. The first speed gear 11, the third speed gear 13 and the fifth speed gear 16 are connected to the first main shaft 4. The second speed gear 12, the fourth speed gear 15, the sixth speed gear 14 and the reverse gear 17 are connected to the second main shaft 5.

In the automatic transmission 1 of a dual clutch-type transmission, the gear can be shifted selectively to a first speed gear, a third speed gear and a fifth speed gear via the first clutch 2. The gear can be shifted selectively to a second speed gear, a fourth speed gear, a sixth speed gear and a reverse gear via the second clutch 3.

Next, a description will be given for a part of the first embodiment of a shift operation device used in the above-described automatic transmission 1.

The shift operation device of the automatic transmission 1 is arranged inside a casing 100 (refer to FIG. 1) to transmit a slide-movement operation force to the shift forks 20 to 23. The shift operation device is shown in FIG. 2 and FIG. 3.

As shown in FIG. 2 and FIG. 3, the shift operation device of the automatic transmission 1 is provided with a shift operation member 55 (refer to FIG. 2) including a shaft portion 50 which extends in a select direction se and an actuator 70 on one end thereof is provided with a plurality of rails 30 axes of which extend in the shift direction sf orthogonal to the shaft portion 50. The shift operation device is also provided with the shift forks 20 to 23 which are integrally joined to the rails 30 to perform the shift operation of the gears 11, 12, 13, 14, 15, 16, 17 inside the automatic transmission 1, and shift lugs which include engagement portions capable of making engagement with arm portions 51 and which are individually provided in a protruding manner on the rails 30, as shown in FIG. 3 and FIG. 1.

In addition, the shift operation includes shift making operation for moving the shift forks to perform gearshift and shift withdrawal operation for moving the shift forks to release gearshift.

Figure 4:
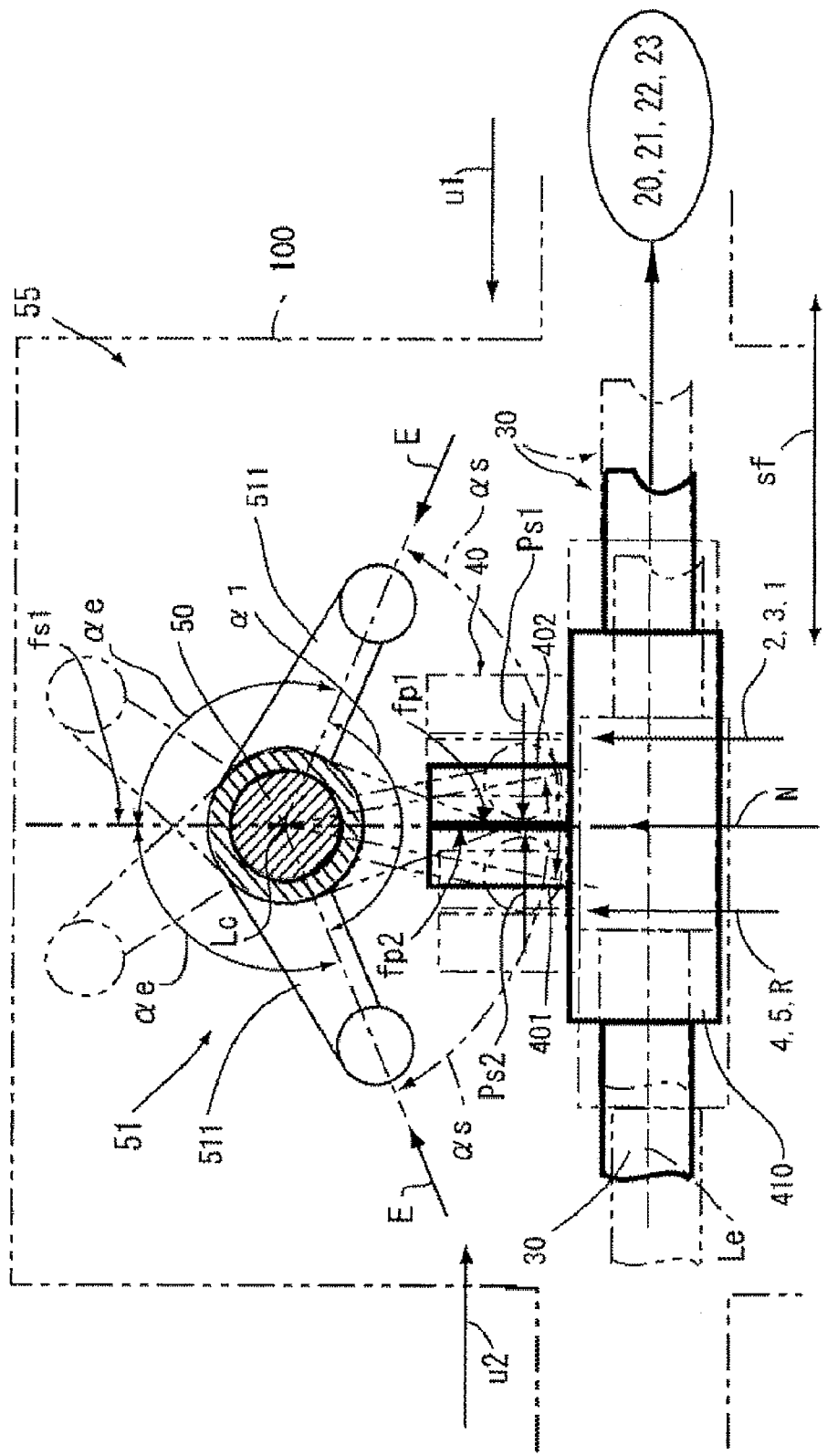
FIG. 4 is a recessed-side view showing an arm portion of a shift operation member and a protruded portion of a rail portion in a neutral state, which are used in the shift operation device shown in FIG. 1.

As shown in FIG. 4, the shift operation member 55 includes the shaft portion 50 supported in the casing 100 so as to make a relative movement in the select direction se and the arm portion 51 formed in such a manner that a pair of arm pieces 511 protrude from a part of the shaft portion 50 in a radial direction with respect to a central axis (select center line) Lc of the shaft portion 50 and have a bifurcated shape.

The pair of arm portions 51 may be offset in the select direction so as to correspond to the shift lug 40. The pair of arm portions 51 are thus offset, thereby movement of the arm portion 51 in the select direction can be omitted on shift operation to result in reduction of the gearshift time.

As shown in FIG. 4, the arm portion 51 is retained in a state that the shift lug 40 is placed between the pair of arm pieces 511, that is, at a set-back position (indicated by the solid line in FIG. 4) E.

The set-back position E is set as a position at which the pair of arm pieces 511 are able to move in the select direction (a perpendicular direction to the plane of FIG. 4) without making any mutual interference at any shift position of the shift lug 40. Here, the set-back position E is set at an intermediate port between the arm pieces 511, that is, a position at which both the arm pieces 511 are arranged at the same angle ($\alpha\frac{1}{2}$) to the shift lug which is in a neutral state.

As indicated by the double dotted chain line in FIG. 4, the pair of arm pieces 511 which correspond to the arm portion 51 are rotated around the select center line Lc by a maximum rotation angle αS at the time of shift operation. Therefore, the arm pieces 511 are formed so that the rotation angle is kept within 180 degrees (half rotation) or less even if a rotation angle (the same angle with αS) at the time of idling operation in an opposite direction is added to the maximum rotation angle αS, and the rotation angle (2×αS) is made relatively small.

Thus, the shift operation device of the automatic transmission 1 is advantageous in that shift operation time by the arm portion 51 can be made relatively short.

Figure 5A:
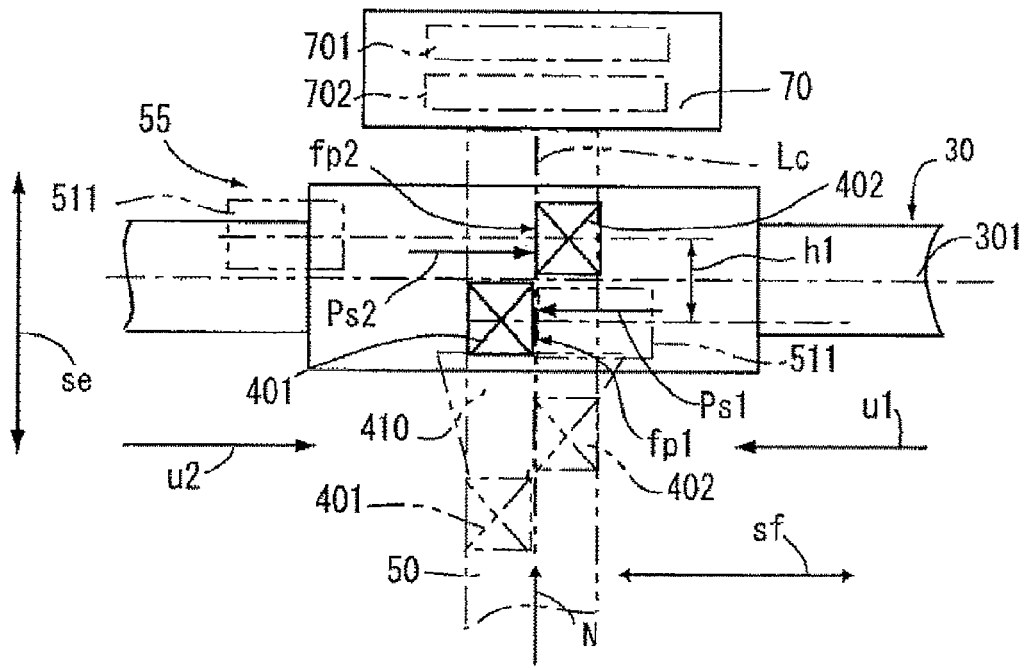
FIG. 5A and FIG. 5B are respectively a plan view and a side view, showing the protruded portion of the rail portion and the arm portion of the shift operation member which presses the protruded portion in a neutral state, which are used in the shift operation device shown in FIG. 1.
Figure 5B:
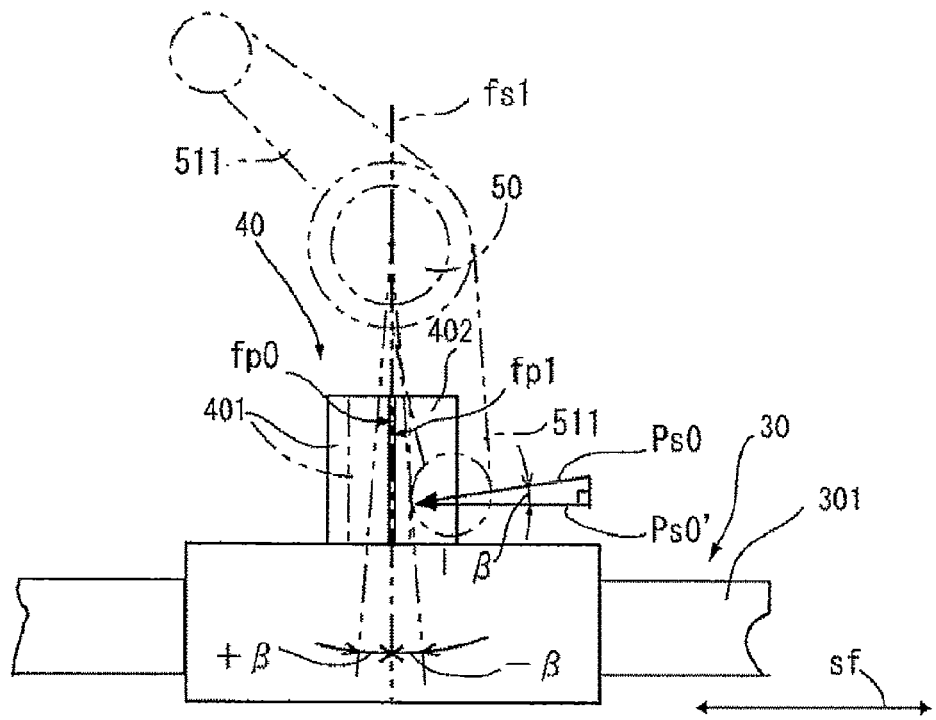

As shown in FIG. 4, FIG. 5A and FIG. 5B, the shift operation member 55 is provided with the actuator 70 which is a shift driving source, the shaft portion 50 supported in the casing 100 so as to make a relative displacement in the select direction se and the arm portion 51 including a pair of arm pieces 511 which protrude from the shaft portion 50 in the radial direction of the shaft portion 50 as to have a bifurcated shape.

In addition, as shown in FIG. 2, the arm portions 51 are provided in a protruding manner respectively at a first position E1 and a second position E2 (refer to FIG. 2), which are spaced with a predetermined interval e in a longitudinal direction of the shaft portion 50.

Next, as shown in FIG. 4, the rail 30 is supported in the casing 100 so as to make a relative displacement, and a plurality of the rails are provided as shown in FIG. 3. Each of the rails 30 is provided with a rail main body 301, the shift forks 20 to 23 protruding from the rail main body 301 to perform shift operation of a gear, and the shift lug 40 protruding from the rail main body 301 and capable of making an engagement with the arm portion 51.

Figure 16:
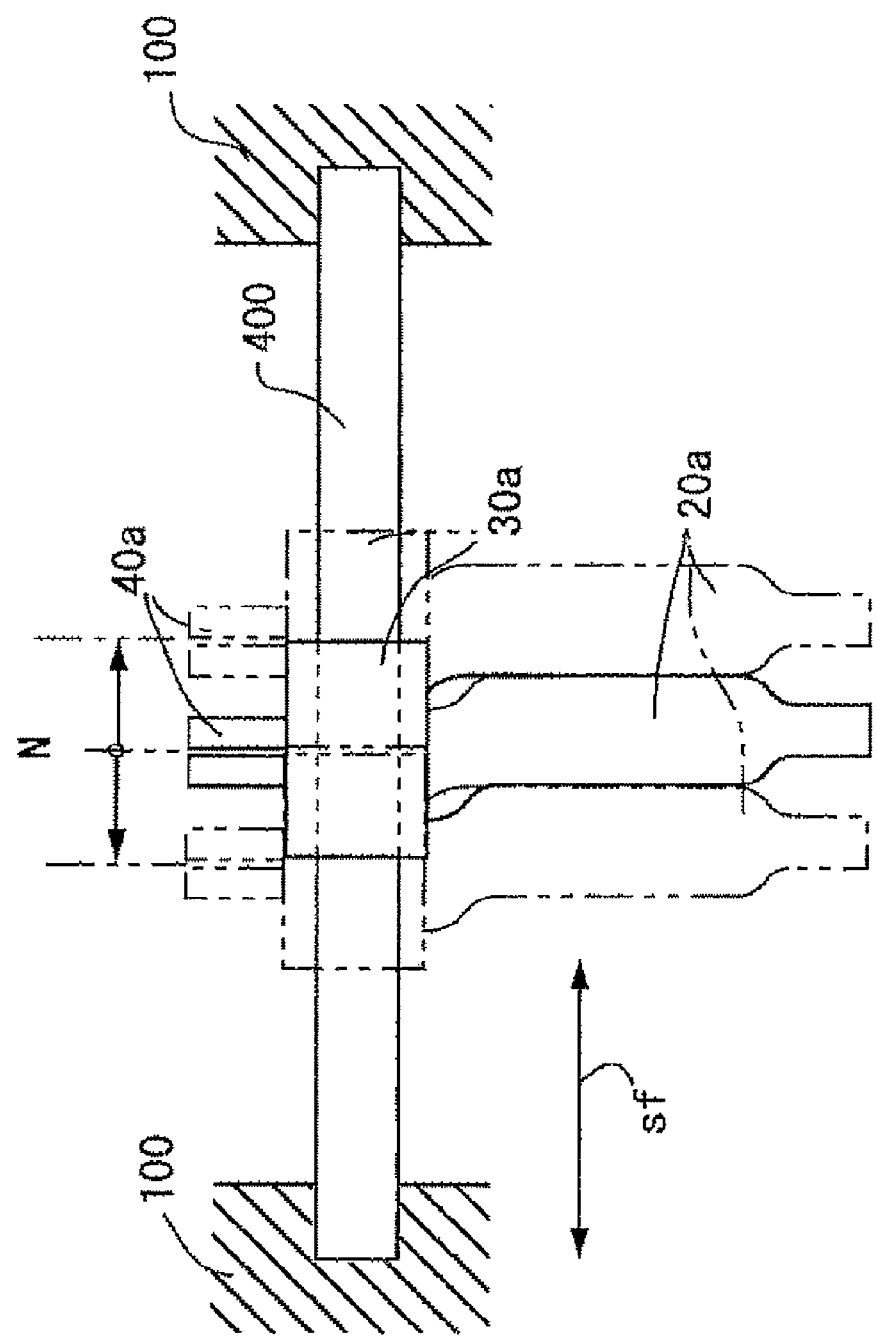
FIG. 16 is a schematic side view showing a rail which can be adopted as an modified example in place of the rail portion used in the shift operation device shown in FIG. 1.

In addition, FIG. 16 shows a modified example of the rail 30. Here, a rail 30a is formed in the shape of a hollow tube fitted at the outside of a fixed shaft 400. Further, a shift fork 20a and a shift lug 40a are provided on the rail 30a in a protruding manner. The rail 30a is supported so as to make a relative displacement in a shift direction se over the fixed shaft 400 fixed on the casing 100. In this case, functions substantially similar to those of the rail 30 shown in FIG. 4 are obtained. In particular, the transmission in itself can be easily reduced in size in the axial dimension and in weight as well.

Then, as shown in FIG. 3 and FIG. 4, the shift lug 40 provided on the rail 30 in a protruding manner is formed with a pair of columnar projections 401, 402 which protrude from the rail main body 301.

An engagement portion of the shift lag 40 which is capable of making an engagement with the arm portion 51 includes a pair of columnar projections 401, 402 which are on the rail 30 and arranged at positions mutually different in the shift direction sf and the select direction se.

In addition, the shift lug is not a pair of projections protruding from the rail but may be formed so as to have one common root protruding from the rail and having leading end portions (acting as the engagement portion) bifurcated so as to be arranged at mutually different positions in the shift direction and in the select direction.

As shown in FIG. 4, FIG. 5A and FIG. 5B, a one-side pressure receiving surface fp1 for receiving a pressing force from one direction u1 by one of the arm pieces 511 of the arm portion 51 being rotated from a neutral position (corresponding to a set-back position) in the shift direction sf is formed at one of the columnar projections 401.

An other-side pressure receiving surface fp2 for receiving a pressing force from an opposite direction u2 from the other of the arm pieces 511 of the arm portions 51 is formed at the other of the columnar projections 402.

In particular, when the rail 30 is retained in a neutral position, the one-side pressure receiving surface fp1 and the other-side pressure receiving surface fp2 are formed so as to be superimposed on the select axis Lc of the shaft portion 50 (extending in the perpendicular direction on the plane of FIG. 4) and positioned on a reference orthogonal surface fs1 which is orthogonal to the center axis Le of each rail 30 and which is described in FIG. 4 as a surface orthogonal to the plane of FIG. 4.

A surface superimposed on the select axis Lc of the shaft portion 50 (extending in the perpendicular direction on the plane of FIG. 4) and also orthogonal to the center axis Le of each rail 30 is set as the reference orthogonal surface fs1 (described in FIG. 4). Here, when the rail 30 is retained in the neutral position, the one-side pressure receiving surface fp1 and the other-side pressure receiving surface fp2 are positioned on the reference orthogonal surface fs1.

The above position at which the one-side pressure receiving surface fp1 and the other-side pressure receiving surface fp2 are positioned on the reference orthogonal surface fs1 includes a position at which the one-side pressure receiving surface fp1 and the other-side pressure receiving surface fp2 are superimposed on the reference orthogonal surface fs1 and a position at which the one-side pressure receiving surface fp1 and the other-side pressure receiving surface fp2 are deviated slightly in the back and forth direction within an assembly allowance of ±5°.

Figure 13:
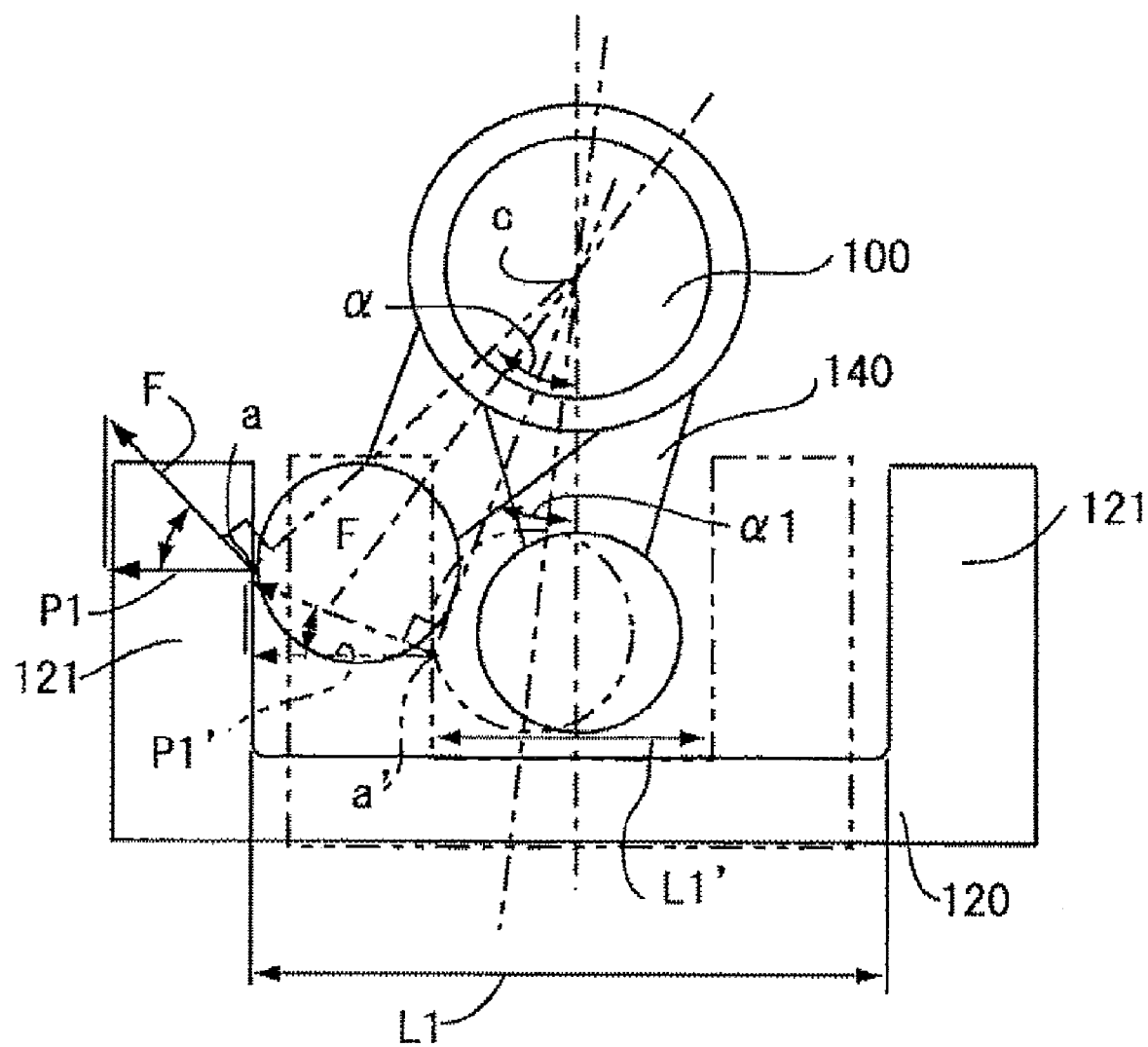
FIG. 13 is a view for explaining the operation of an arm portion and a protruded portion of a related-art shift operation device.
Figure 14A:
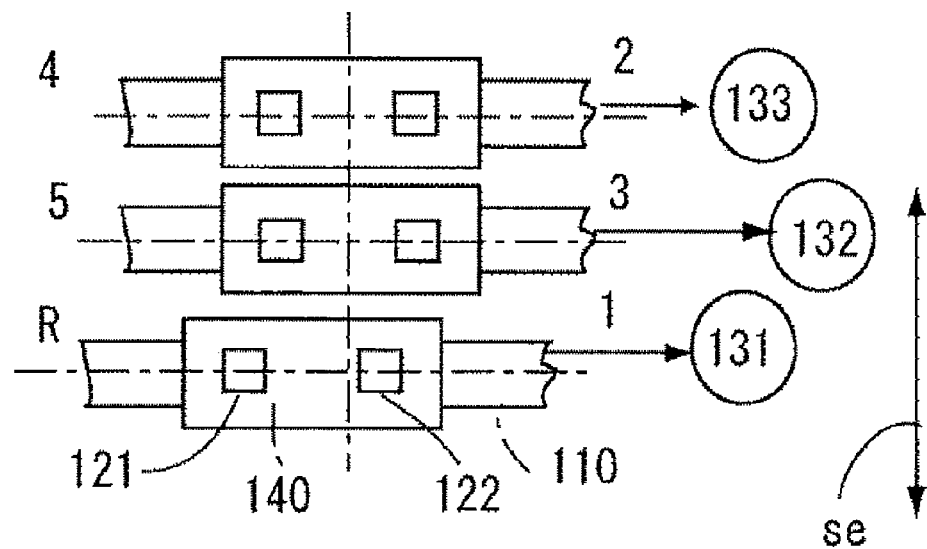
FIG. 14A and FIG. 14B are respectively a plan view and a side view, showing the arm portion and the protruded portion when a gear is shifted to a reverse gear by the related-art shift operation device.
Figure 14B:
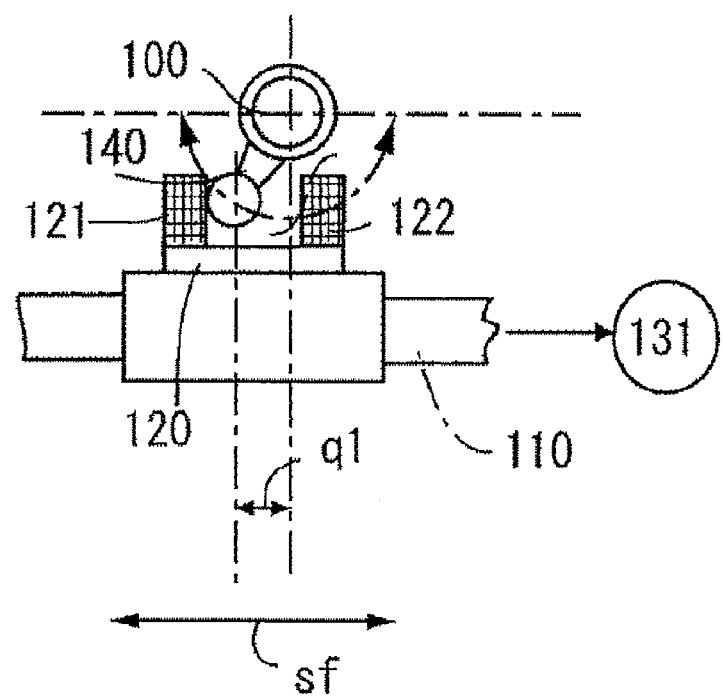
Figure 15A:
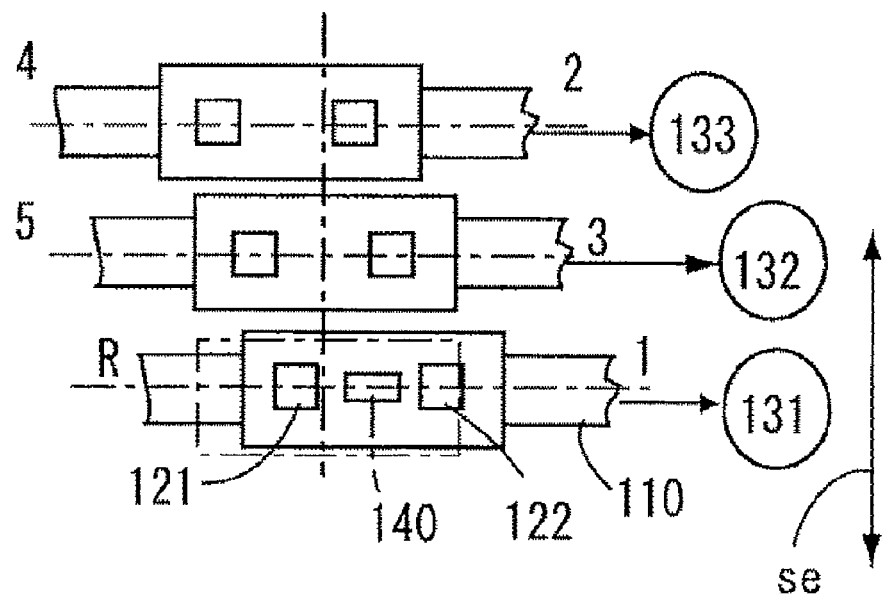
FIG. 15A and FIG. 15B show the arm portion and the protruded portion when the shift withdrawal operation of a fourth speed gear is performed while the shift making operation of a first speed gear is retained by the related-art shift operation device.
Figure 15B:
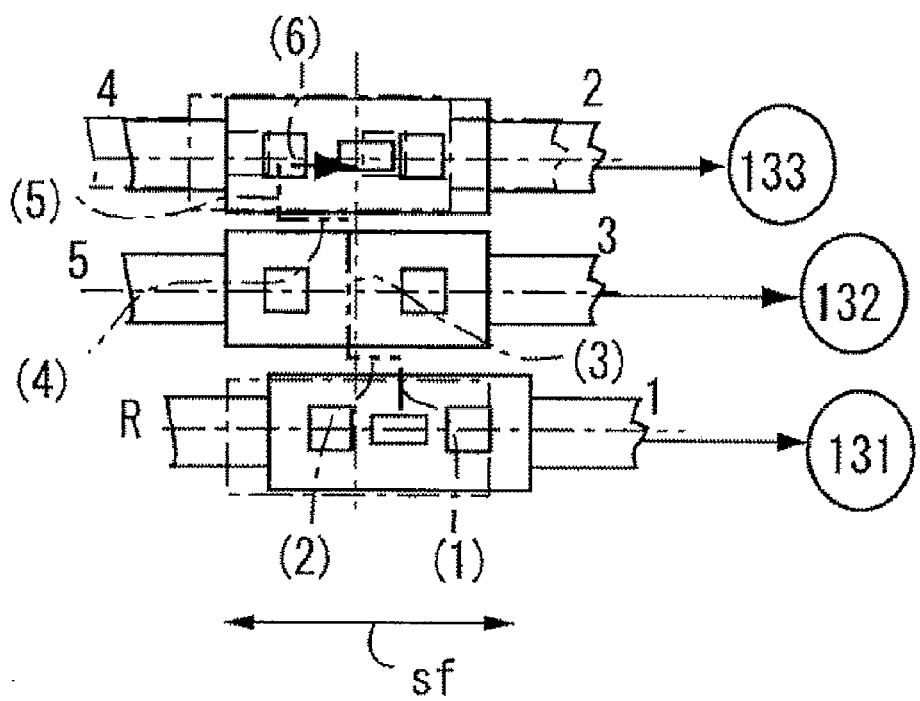

In other words, the pressing force applied to the pressure receiving surface of the columnar projection includes a pressing force Ps0 which is applied to a pressure receiving surface fp0 as shown in FIG. 5B which is positioned on the reference orthogonal surface fs1 and a pressing force Pp0' ($=\cos \beta \times Ps0$) which is applied to the pressure receiving surface deviated at angle ±β to the pressure receiving surface fp0 and which is reduced to some extent. Therefore, the above positioning is set appropriately in such a range as to secure a sufficiently great value as compared with a pressing force P1 in the related art shown in FIG. 13.

Further, as shown in FIG. 5A, the one-side pressure receiving surface fp1 on one of the columnar projections 401 and the other-side pressure receiving surface fp2 on the other of the columnar projections 402 are arranged in proximity with each other, with a predetermined amount h1 kept in the select direction se.

Figure 6A:
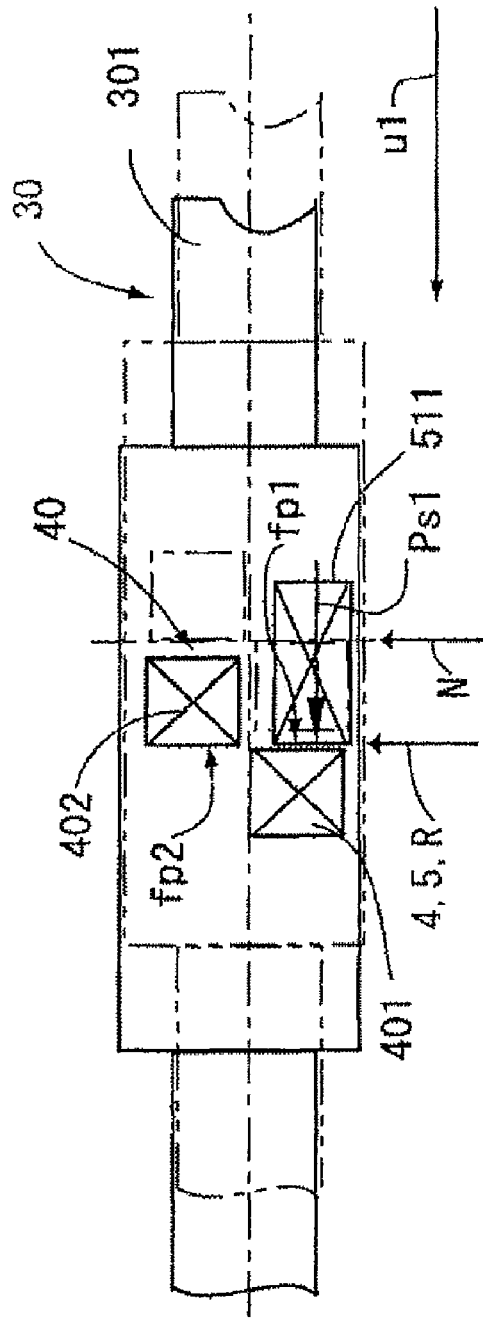
FIG. 6A and FIG. 6B are plan views for explaining the arm portion of the shift operation member and the protruded portion of the rail portion, which are used in the shift operation device shown in FIG. 1.
Figure 6B:
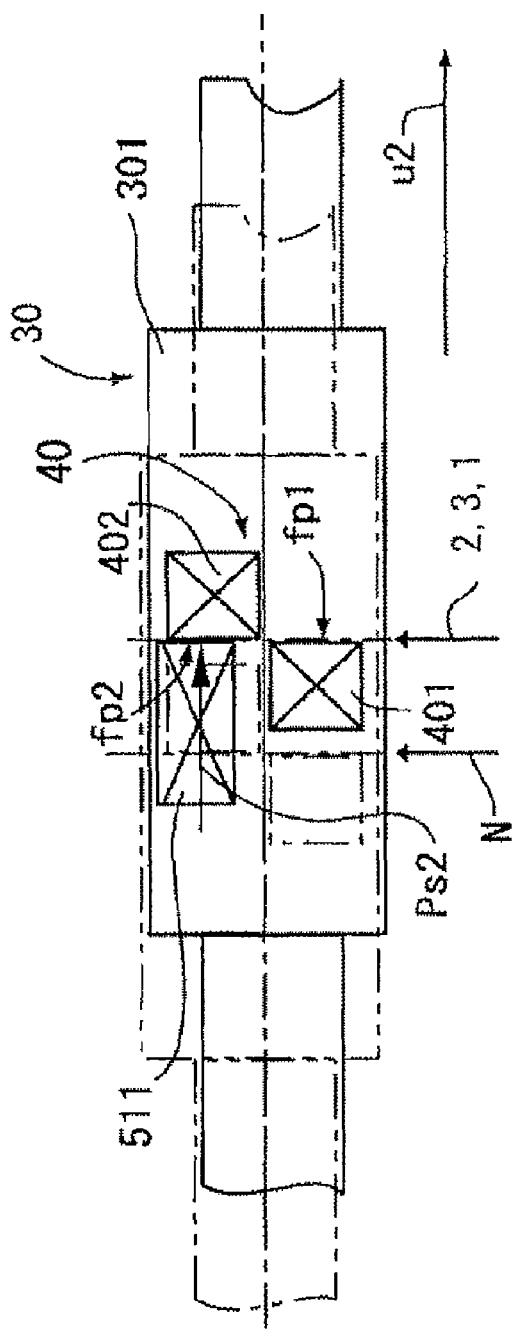

In the above-described configuration, the one-side pressure receiving surface fp1 receives a pressing force Ps1 from one of the arm pieces 511 of the arm portion 51 approximately in an orthogonal state from one direction u1, thereby one of the columnar projections 401 and the rail 30 can be shift-actuated smoothly in one direction (refer to FIG. 6A). The other-side pressure receiving surface fp2 receives a pressing force Ps2 from the other of the arm pieces 511 of the arm portion 51 approximately in an orthogonal state from the other direction (opposite direction) u2, thereby the other of the columnar projections 402 and the rail 30 can be shift-actuated in the opposite direction (refer to FIG. 6B). In other words, since the one-side pressure receiving surface fp1 and the other-side pressure receiving surface fp2 are positioned approximately on the reference orthogonal surface fs1, the pressing forces Ps1 and Ps2 from the arm portion 51 being rotated around the select axis Lc superimposed on the reference orthogonal surface fs1 are given from an orthogonal direction to the one-side pressure receiving surface fp1 and the other-side pressure receiving surface fp2.

Therefore, the pressing forces Ps1 and Ps2 in one direction and in the opposite direction applied from the arm portion 51 are almost all transmitted at a higher efficiency to the shift lug and the shift fork formed integrally therewith, (including about a 10% reduction in transmission). Thus, the transmission efficiency can be kept at a higher level to secure a smooth shift actuation.

Further, as described above, a relatively great force for shift operation (shift making operation) can be applied to the shift lug and the shift fork formed integrally therewith to reduce the gearshift time.

Incidentally, as shown in FIG. 2 and FIG. 3, a first group in which gears are arranged on the first main shaft 4 (first, fifth and third speed gears), a second group in which gears are arranged on the second main shaft 5 (second and fourth speed gears and a reverse gear), a third group in which gears are arranged on the first auxiliary shaft 6 (first, second, third and sixth speed gears) and a fourth group in which gears are arranged on the second auxiliary shaft 7 (fourth and fifth speed gears and a reverse gear) are provided. The arm portion 51 at the first position E1 for shifting each of the gears (first, second, third, sixth speed gears) in the third group and the arm portion 51 at the second position E2 for shifting each of the gears (fourth and fifth speed gears and a reverse gear) in the fourth group are provided on the shaft portion 50 so as to be spaced away in the select direction se with the predetermined interval e. Thereby, of four select positions Se1 to Se4 in the select direction, the arm portion 51 at the first position E1 is opposed to Se1 and Se3, and the arm portion 51 at the second position E2 is opposed to Se2 and Se4, thus making it possible to perform select actuation.

On the assumption that the shaft portion 50 moves sequentially in the select direction by a switching amount de (refer to FIG. 2), first, the arm portion 51 at the first position E1 is opposed to Se1, next, the arm portion 51 at the second position E2 is opposed to Se2, then, the arm portion 51 at the first position E1 is opposed to Se3, and finally, the arm portion 51 at the second position E2 is opposed to Se4.

Both of the arm portions 51 at the first and the second positions E1, E2 are provided so as to be spaced away from each other with the predetermined interval e (refer to FIG. 2), thereby eliminating the movement of the shaft portion 50 over the predetermined interval e.

The arm portion 51 at the first position E1 shifts each of the gears in the third group, and the arm portion 51 at the second position E2 shifts each of the gears in the fourth group. Thereby, the necessity for the arm portions 51 to move in the select direction over the predetermined interval e in the third and fourth groups is eliminated. Further, the movement of the shaft portion 50 in the select direction se is made relatively small. The operability of the select operation system is improved.

As shown in FIG. 2 and FIG. 3, the shaft portion 50 is rotated and driven around the select axis Lc in the shift direction by a shift motor 701 and a reduction gear Gsf working therewith and also driven in a sliding manner by a select motor 702 and a reduction gear Gse working therewith in a direction of the select axis Lc. The shift motor 701 and the select motor 702 constitute an actuator 70. Each of the actuators 70 is driven and controlled by an ECU 62 on the basis of operation of a shift lever (not illustrated), running conditions of an engine 8 (not illustrated) and others. These actuators are sequentially switched and controlled, for example, when a current gear is shifted to a target gear.

The ECU 62 controls the actuation of clutches 2, 3 at the time of gearshift. More specifically, a current gear which is in a state in which one of the clutches 2, 3 is connected, is shifted to a target gear to which the shift operation has been completed in advance by connecting to the other of the clutches 3, 2 which is not connected to an engine while retaining the state of the current gear. In other words, in a state that the shift operation for the target gear has been completed, the clutches 2, 3 are switched in connection, thereby providing a seamless gearshift.

Next, a description will be given for a case where a current gear is a first speed gear (on the side of the clutch 2) and the gear is shifted up to a second speed gear (on the side of the clutch 3) by referring to FIG. 7A and FIG. 7B.

In this case, the current gear is the first speed gear, the arm portion 51 at the first position E1 which is retained in a neutral position is moved to a sixth to second speed gear shift line (refer to Se3 in FIG. 2), and the arm portion 51 is thereafter rotated. Then, the columnar projection 402 of the shift lug 40 is shift-actuated to the second speed gear (refer to the double dotted chain line in FIG. 7B, FIG. 6B).

Thereafter, the clutch 2 and the clutch 3 are gradually switched in connection, thereby providing a seamless gearshift. Thereafter, the arm portion 51 at the first position E1 is rotated at a neutral position on the sixth to second speed shift line, and then moves in the select direction and returns to a neutral position on a first to third speed gear shift line (refer to Se1 in FIG. 2). In the position, the arm portion 51 at the first position E1 is rotated, thereby the columnar projection 402 being opposed to the arm portion 51 on a first to third speed gear rail 30 (indicated by the double dotted chain line) is returned from the first speed gear to a neutral position to complete returning processing r.

In particular, when the gear is shifted to a target gear after being moved in the select direction from a current gear (first speed gear) through a neutral position to a neutral position on the side of the target gear (second speed gear), the other-side pressure receiving surface fp2 of the columnar projection 402 can receive a pressing force Ps2 at a higher efficiency from the direction u2 (refer to FIG. 6B) by one of the arm pieces 511 (of the arm portion 51) from an orthogonal direction. Therefore, a shift actuation force from the arm piece 511 (of the arm portion 51 at the first position E1) can be transmitted at a higher transmission efficiency. And, a relatively great force of shift operation (shift making operation) can also be applied from the arm portion to a shift lug and a shift fork formed integrally therewith to reduce the gearshift time.

Further, in subsequent shift withdrawal operation, the gear is returned through the neutral position of the target gear (second speed gear) to the neutral position of the previous gear (first speed gear), and the other-side pressure receiving surface fp2 of the columnar projection 402 is pressed by the arm portion 51 at the first position E1 (one of the arm pieces 511) to perform returning processing r for returning the previous gear to the neutral position (refer to FIG. 7A), thereby completing the shift withdrawal processing. Therefore, the shift withdrawal operation can be performed relatively smoothly to reduce the gearshift time as well.

Next, a description will be given by referring to FIG. 8A and FIG. 8B for a case where a current gear is a fifth speed gear and shifted up to a sixth speed gear.

The current gear is a fifth speed gear (indicated by the solid line) and the actuator 70 retains both the arm portions 51 at the first and the second positions E1, E2 at the neutral position. Then, the actuator 70 allows the arm portion 51 at the first position E1 to move in the select direction on a sixth to second shift line (refer to Se3 in FIG. 2), giving a pressing force Ps1 from the direction u1 to the one-side pressure receiving surface fp1 of the columnar projection 401 in a sixth speed gear (target gear) by one of the arm pieces 511 (of the arm portion 51 at the first position E1), thereby shifting the gear to a sixth speed gear (refer to FIG. 8B and FIG. 6B).

Thereafter, the clutch 2 and the clutch 3 are gradually switched in connection, thereby providing a seamless gearshift. Thereafter, shift withdrawal operation is performed. Here, after both of the arm portions 51 at the first and the second positions E1, E2 are rotated in the neutral position, the arm portion 51 at the second position E2 is returned to a parking to fifth shift line at the previous fifth speed gear (previous gear) and one of the arm pieces 511 at the second position E2 (the arm portion 51 at the second position E2) is rotated, thereby the one-side pressure receiving surface fp1 of the columnar projection 401 in the previous fifth speed (previous gear) is pressed. Returning processing r (refer to FIG. 8A) is performed to complete the shift withdrawal operation.

When the gear is shifted to a target gear after being moved in the select direction from a current gear (fifth speed gear) to the target gear (sixth speed gear), the one-side pressure receiving surface fp1 of the columnar projection 401 can receive a pressing force Ps1 in the direction u1 (refer to FIG. 6A) at a higher efficiency from one of the arm pieces 511 (of the arm portion 51 at the first position E1) from an orthogonal direction. Therefore, a shift actuation force from the arm portion 51 can be transmitted at a higher transmission efficiency, thereby a relatively great force of shift operation (shift making operation) can be applied from an arm portion to a shift lug and a shift fork formed integrally therewith to reduce the gearshift time.

Further, in shift withdrawal operation, the arm portion 51 at the second position E2 is moved in the select direction and is returned to a previous gear (fifth speed gear) from the target gear (sixth speed gear), the one-side pressure receiving surface fp1 of the columnar projection 401 is pressed by one of the arm pieces 511 of the arm portion 51 at the second position E2. Then, returning processing r for returning the previous gear to the neutral position (refer to FIG. 8A) is performed to complete the shift withdrawal processing. Therefore, the shift withdrawal operation can also be performed relatively smoothly to reduce the gearshift time.

The above-described automatic transmission 1 is of a dual clutch type, and the present invention is a shift operation device of the dual clutch-type automatic transmission 1 which is capable of transmitting a shift actuation force from the arm portion 51 at a higher transmission efficiency and also capable of applying a relatively great force of shift operation (shift making operation) from the arm portion 51 to a shift lug 40 and a shift fork 20 formed integrally therewith to reduce the gearshift time. Thus, when the present invention is applied, in particular, functions of improving shift speeds are in synchronization with those of the dual clutch to further improve the shift operability.

Next, a description will be given for a part of a second embodiment used in the shift operation device of the automatic transmission 1 of the present invention by referring to FIG. 9 to FIG. 12B.

In addition, the shift operation device of the second embodiment is similar in configuration to the first embodiment except that each of arm portions 51 which are arranged at the first and the second position E1, E2 inside a shift operation member 55 is formed into a single-shape member having one projection. Therefore, overlapping explanation will be omitted here.

Figure 9:
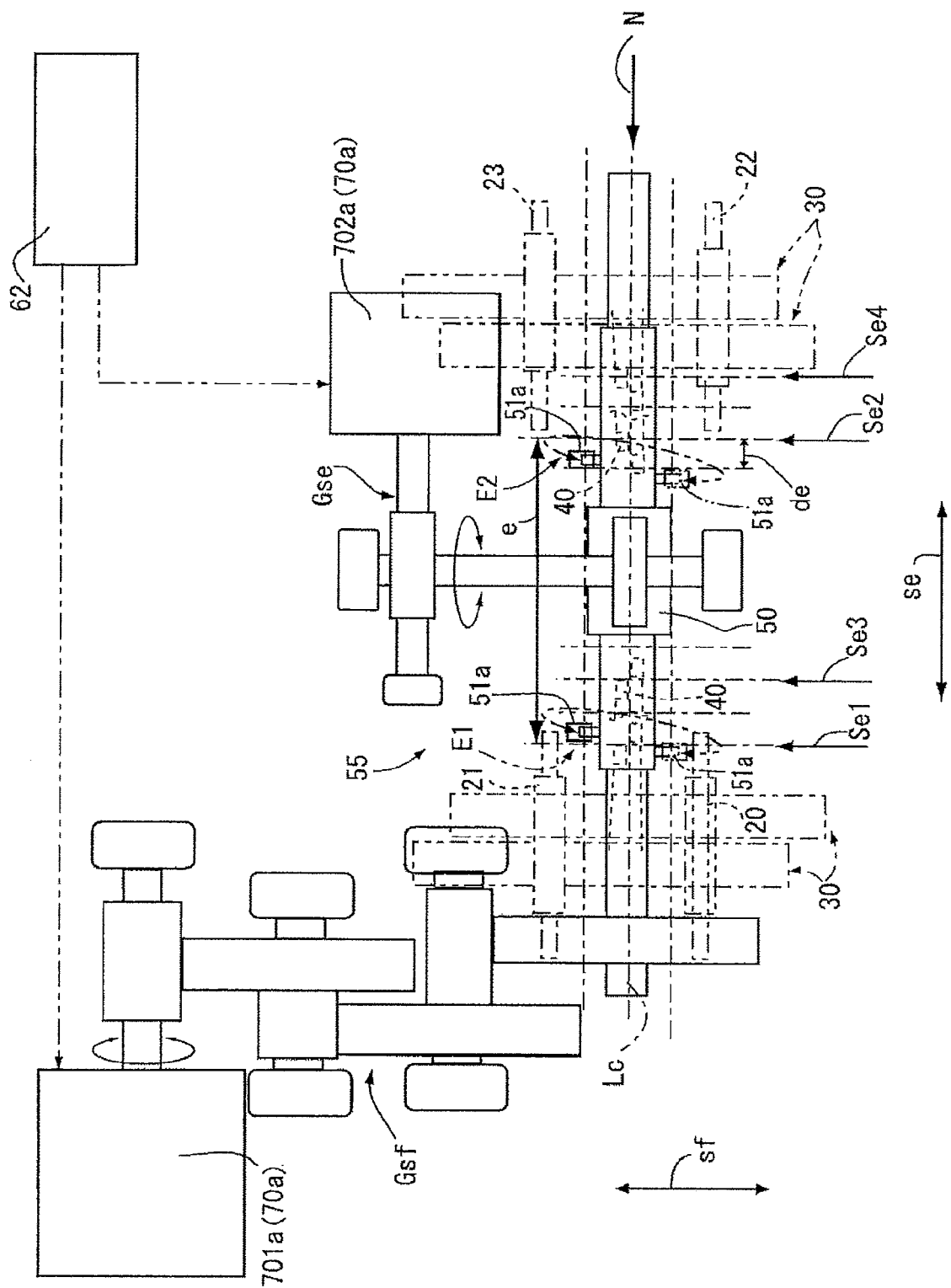
FIG. 9 is a schematic plan view for explaining a shift operation device of an automatic transmission as another embodiment of the present invention.
Figure 10A:
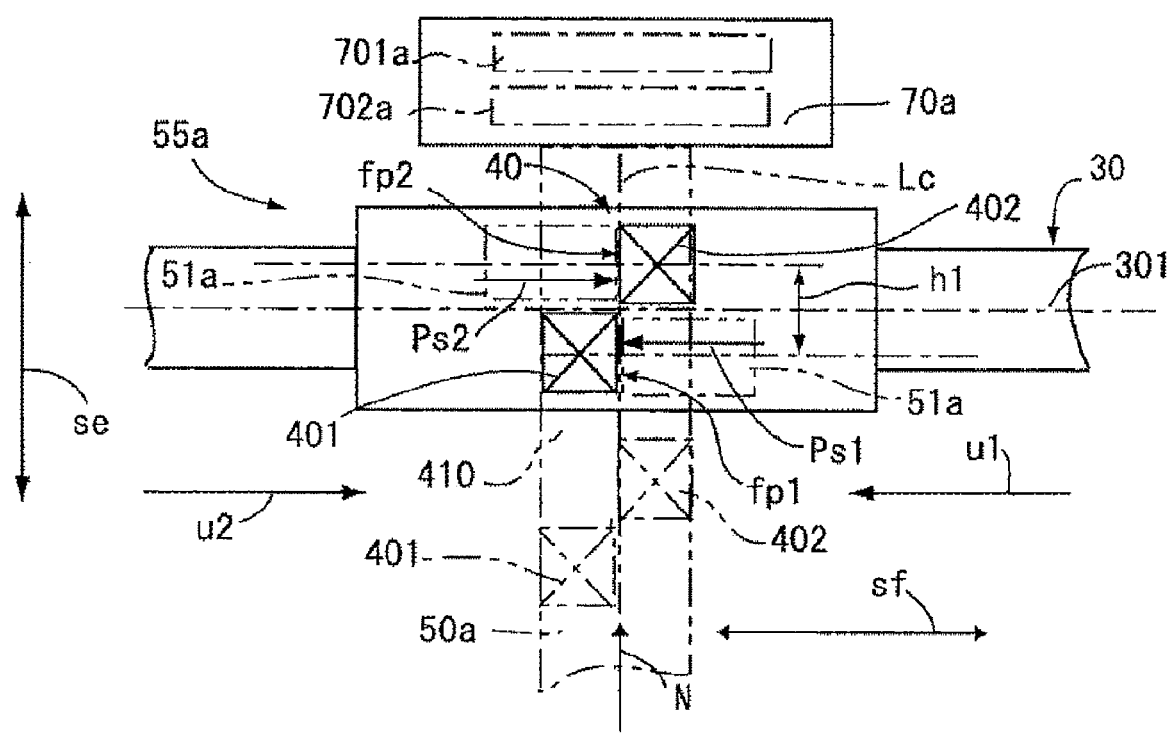
FIG. 10A and FIG. 10B are respectively a plan view and a side view showing a protruded portion of a rail portion and an arm portion of a shift operation member which presses the protruded portion in a neutral state, which are used in the shift operation device shown in FIG. 9.
Figure 10B:
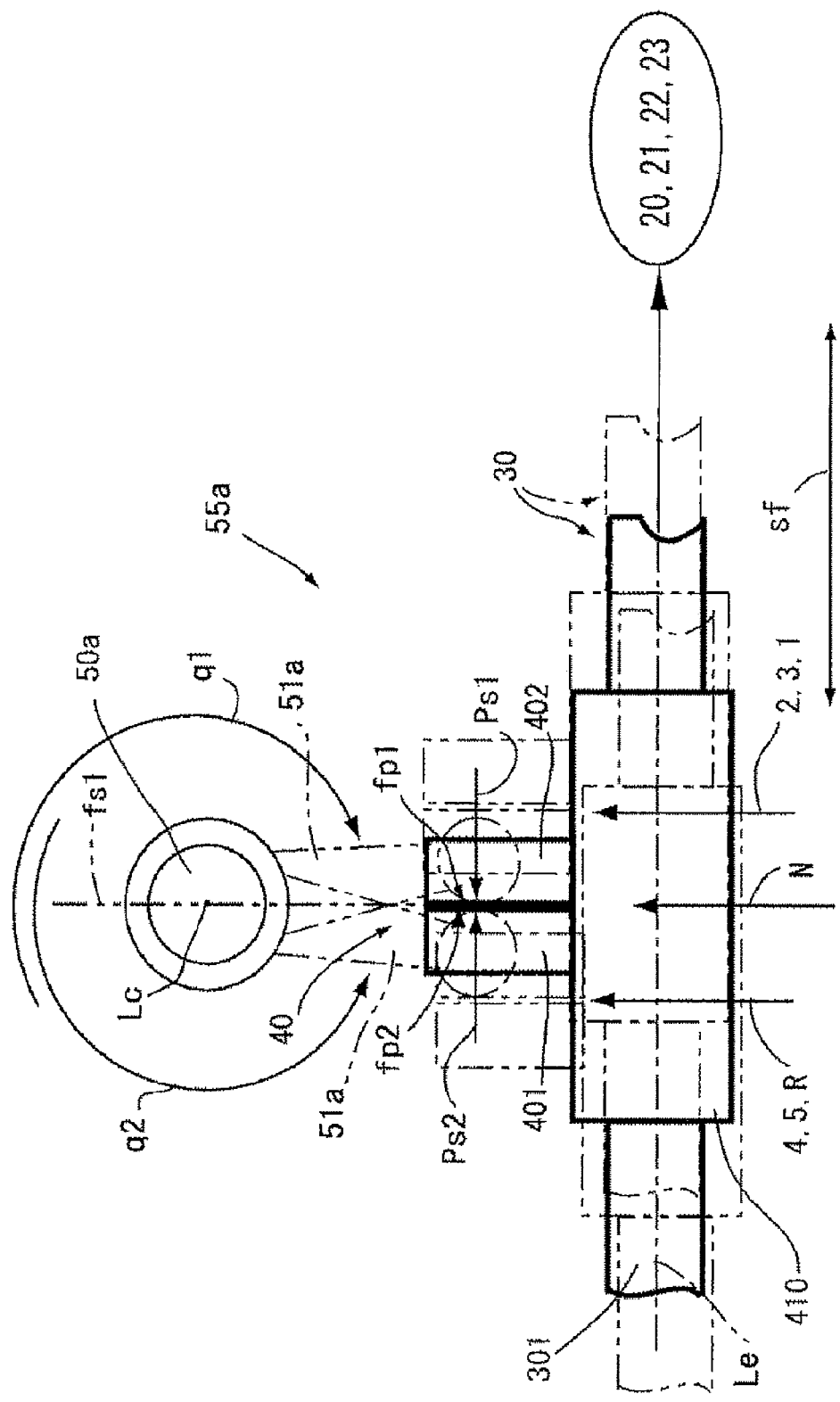

As shown in FIG. 9, FIG. 10A and FIG. 10B, the arm portions 51 which are arranged at the first and the second positions E1, E2 on the shaft portion 50 and formed into a single-shape member are controlled for the position by an actuator 70a so as to be deviated by a predetermined amount h1 (refer to FIG. 10A) in the select direction se and also so as to be in contact with the one-side pressure receiving surface fp1 of one of the columnar projections 401 in an orthogonal state at the time of rotation q1 in one direction (refer to FIG. 10B) and in contact with the other-side pressure receiving surface fp2 of the other of the columnar projections 402 in an orthogonal state at the time of rotation q2 in an opposite direction (refer to FIG. 10B).

As shown in FIG. 10A and FIG. 10B, the actuator 70a for driving the shaft portion 50 includes a shift motor 701a and a select motor 702a. The actuator 70a is controlled by an ECU 62a which is driven on the basis of shift lever operation (not illustrated), running conditions of an engine 8 (not illustrated) and others. For example, the shaft portion 50 is driven in a sliding manner in a direction of the select axis Lc and also driven rotationally around the select axis Lc in the shift direction, thereby providing such control that a current gear is shifted to a target gear.

In particular, in shift operation at two select positions Se1, Se3 to which the arm portion 51 at the first position E1 is opposed and in shift operation at two select positions Se2, Se4 to which the arm portion 51 at the second position E2 is opposed, the arm portions 51 are controlled for the position so as to be deviated by a predetermined amount h1 in the select direction se and also so as to be in contact with the one-side pressure receiving surface fp1 of one of the columnar projections 401 at the time of rotation q1 in one direction and in contact with the other-side pressure receiving surface fp2 of the other of the columnar projections 402 at the time of rotation q2 in the opposite direction.

Next, a description will be given for a case where a current gear is a first speed gear (the side of the first clutch 2) and is shifted up to a second speed gear (the side of the second clutch 3) by referring to FIG. 11A and FIG. 11B.

In this case, the single-shape arm portion (hereinafter, simply referred to as the single arm portion) 51a is moved in the select direction to a sixth to second speed gear shift line (refer to Se3 in FIG. 2) while being retained in a set-back position in which the single arm portion 51a is movable in the select direction. Then, the single arm portion 51a starts rotation q2 (refer to FIG. 11B) to provide shift operation, thereby the columnar projection 402 of the shift lug 40 is shifted to a second speed gear. Thereafter, the shift operation to the second speed gear stage is completed, and the clutch 2 and the clutch 3 are gradually switched in connection to provide seamless gearshift. Thereafter, the single arm portion 51a is rotated, and the single arm portion 51a is moved in the select direction at the set-back position in which the single arm portion 51a is movable in the select direction, is retuned to a first to third speed gear shift line (refer to Se1 in FIG. 2) for rotation at this speed gear shift line, thereby completing returning processing r for returning the columnar projection 402 being opposed to the single arm portion 51a on the first to third speed gear rail 30 from a first speed gear to the neutral position. Then, the single arm portion 51a is returned to the set-back position in which the single arm portion 51a is movable in the select direction.

When the gear is shifted to a target gear after being moved in the select direction to the neutral position on the target gear (second speed gear), the other-side pressure receiving surface fp2 of the columnar projection 402 can receive a pressing force Ps2 from the direction u2 by the rotation q2 of the single arm portion 51a from an orthogonal direction (refer to FIG. 11B). Therefore, a shift actuation force from the single arm portion 51a can be transmitted at a higher transmission efficiency. A relatively great force of shift operation (shift making operation) can be applied from the single arm portion 51a to the shift lug 40 and the shift fork 20 formed integrally therewith to reduce the gearshift time.

Further, in subsequent shift withdrawal operation, the single arm portion 51a is returned to the set-back position corresponding to the previous gear (first speed gear), the other-side pressure receiving surface fp2 of the columnar projection 402 is pressed by the rotation q2 of the single arm portion 51a to perform returning processing r for returning to the neutral position. Therefore, the shift withdrawal operation can be performed smoothly to reduce the gearshift time.

Further, the single arm portion 51a may be moved in the select direction at the same time of the rotation q2 in the shift direction. In this case, the gearshift time can be further reduced.

Next, a description will be given for a case where the current gear is a fifth speed gear and is shifted up to a sixth speed gear by referring to FIG. 12A and FIG. 12B.

In this case, the current gear is a fifth speed gear (indicated by the solid line), the single arm portion 51a at the first position E1 is moved in the select direction on a sixth to second shift line (refer to Se3 in FIG. 2), and the rotation q1 of the single arm portion 51a is performed (refer to FIG. 12B), thereby a pressing force Ps1 is applied from the direction u1 to the one-side pressure receiving surface fp1 of the columnar projection 401 on the side of the sixth speed gear (target gear) and the gear is shifted to the sixth speed gear.

Thereafter, shift operation to the sixth speed gear is completed and the clutch 2 and the clutch 3 are gradually switched in connection to provide seamless gearshift.

Thereafter, in shift withdrawal operation, each of the single arm portions 51a is rotated at the set-back position and then is returned to a parking to fifth shift line in the previous speed (previous gear). The single arm portion 51a at the second position E2 is rotated to press the one-side pressure receiving surface fp1 (the right side surface in FIG. 12A and FIG. 12B) of the columnar projection 401 of the previous fifth speed gear (previous gear) to complete returning processing r.

When the gear is shifted to the target gear (sixth speed gear), the one-side pressure receiving surface fp1 of the columnar projection 401 can receive efficiently a pressing force Ps2 from the direction u2 by the rotation q1 of the single arm portion 51a in an orthogonal direction (refer to FIG. 12B). Therefore, it is possible to transmit a shift actuation force from the single arm portion 51a at a higher transmission efficiency. Further, a relatively great force of shift operation (shift making operation) can be applied by the single arm portion 51a to the shift lug 40 and the shift fork 20 formed integrally therewith to reduce the gearshift time.

Further, in subsequent shift withdrawal operation, the single arm portion 51a is returned to the set-back position corresponding to the previous gear (fifth speed gear), and the one-side pressure receiving surface fp1 of the columnar projection 401 is pressed by the rotation q1 of the single arm portion 51a to perform returning processing r to the neutral position. Therefore, the shift withdrawal operation can be performed smoothly to reduce the gearshift time.

Still further, the single arm portion 51a may be moved in the select direction at the same time of the rotation q1 in the shift direction. In this case, the gearshift time can be further reduced.

The above-described automatic transmission 1 is of a dual clutch type, and the present invention is a shift operation device of the dual clutch-type automatic transmission 1 which is capable of transmitting a shift actuation force from the single arm portion 51a at a higher transmission efficiency and also capable of applying a relatively great force of shift operation (shift making operation) from the single arm portion 51a to the shift lug 40 and the shift fork 20 formed integrally therewith to reduce the gearshift time. Thus, when the present invention is applied, in particular, functions of improving shift speeds are in synchronization with those of the dual clutch to further improve the shift operability.

The present invention is also applicable to a shift operation device of an automatic transmission using an single clutch, in addition to the above-described dual clutch-type automatic transmission, thereby providing similar effects and advantages.

According to an aspect of the present invention, when a pair of columnar projections at a shift lug are in a neutral position, a one-side pressure receiving surface to which a one-direction pressing force is applied from an arm portion and an other-side pressure receiving surface to which an other-direction pressing force is applied from the arm portion are positioned on a reference orthogonal surface. Therefore, the one-direction pressing force and the other-direction pressing force which are applied from the arm portion in the neutral position are almost all applied at a higher transmission efficiency to the one-side pressure receiving surface and the other-side pressure receiving surface from an orthogonal direction. Thereby, the transmission efficiency is improved, and a relatively great force of shift operation can be applied from the arm portion to a shift lug and a shift fork portion formed integrally therewith in one direction or in the opposite direction, thus making it possible to reduce the gearshift time.

According to an aspect of the present invention, an arm portion is formed in a protruding manner so as to have a bifurcated shape and a one-side pressure receiving surface to which a one-direction pressing force is applied and an other-side pressure receiving surface to which an other-direction pressing force is applied are provided, the one-side pressure receiving surface and the other-side pressure receiving surface are positioned on a reference orthogonal surface, thereby both of the pressing forces can be applied in a direction orthogonal to both the pressure receiving surfaces at a higher transmission efficiency to result in improvement in the transmission efficiency. A relatively great force of shift operation can be applied to the shift lug and the shift fork formed integrally therewith from one of the arm portions to one direction or from the other of the arm portions to the opposite direction. Thus, the gearshift time can be reduced, and in particular, a rotation angle around the center axis of the shaft portion of the arm portion can be set relatively small, thus making it possible to make shift operation time relatively short.

The present invention is applicable to a shift operation device of an automatic transmission in which a rotating force can be shifted and transmitted selectively to each of the auxiliary shafts of the automatic transmission via a first main shaft and a second main shaft of a dual clutch and also via a shift gear. In particular, shifting process can be reduced to improve shift speeds, the shift operation device is in synchronization with the dual clutch to further improve the shift operability.

According to an aspect of the present invention, the arm portion at the first position is shifted to each of the gears in the third group while the arm portion at the second position is shifted to each of the gears in the fourth group, thereby the necessity for the arm portion to move in the select direction over the third and fourth groups is eliminated. Further, the shaft portion may be moved in the select direction to a relatively small extent, thereby improving the operability of members of a select operation system and reducing the size.

What is claimed is:

1. A shift operation device of an automatic transmission, the shift operation device comprising:
 a shift operation member including:
  a shaft portion supported in a casing of the transmission so as to make a relative displacement in a select direction; and
  an arm portion protruding in a radial direction with respect to a center axis of the shaft portion, and moving in the select direction while being retained in a set-back position in which the arm portion is movable in the select direction, thereafter being rotated around the center axis to perform shift operation of a gear; and
 a plurality of shift rail members, each of which includes:
  a rail portion supported in the casing so as to make a relative displacement;
  a shift fork portion protruding from the rail portion and performing shift operation of a gear; and
  a shift lug portion protruding from the rail portion and capable of being engaged with the arm portion;
 wherein an engagement portion of the shift lug portion which is engaged with the arm portion includes a pair of columnar projections arranged at positions mutually different in the shift direction and in the select direction,
 one of the columnar projections includes a one-side pressure receiving surface for receiving a one-direction pressing force in one direction of the shift direction from the arm portion,
 the other of the columnar projections includes an other-side pressure receiving surface for receiving an opposite-direction pressing force in a direction opposite to the one-direction pressing force from the arm portion,
 when the shift lug portion is retained in a neutral position, the one-side pressure receiving surface and the other-side pressure receiving surface are approximately positioned on a reference orthogonal surface which is superimposed on the center axis of the shaft portion and which is orthogonal to the rail portion, and
 the arm portion is rotated around the center axis from the set-back position to apply the one-direction processing force to the one-side pressure receiving surface, thereby shift-actuating the shift fork portion in one direction and the arm portion is rotated reversely around the center axis from the set-back position to apply the other-direction pressing force to the other-side pressure receiving surface, thereby shift-actuating the shift fork portion in the other direction.

2. The shift operation device of the automatic transmission according to claim 1, wherein
 the arm portion is formed in a protruding manner from the shaft portion so as to be a pair of arm portions having a bifurcated shape and is retained such that the engagement portion of the shift lug portion is arranged at an intermediate part between both of the arm portions when being retained in the set-back position.

3. The shift operation device of the automatic transmission according to claim 1, wherein
 the automatic transmission has a plurality of gears,
 the gears are divided into a first group and a second group,
 a first main shaft and a second main shaft corresponding to the first group and the second group, respectively are provided, and
 both of the first and second main shafts are coupled via a dual clutch to an output shaft of an engine.

4. The shift operation device of the automatic transmission according to claim 3, wherein
 the automatic transmission has a transmission output gear for outputting a rotating force shifted by the gear,
 the plurality of gears are divided into a third group and a fourth group,
 a first auxiliary shaft and a second auxiliary shaft which correspond to the third group and the fourth group, respectively and transmit to the transmission output gear a rotating force shifted are provided,
 the shaft portion is formed with, in a protruding manner:
  an arm portion for shifting each gear in the third group at a first position; and
  an arm portion for shifting each gear in the fourth group at a second position, and
 the first position and the second position are arranged so as to be spaced with a predetermined interval in the select direction.

* * * * *